United States Patent
Jacobson

(10) Patent No.: US 10,504,070 B2
(45) Date of Patent: Dec. 10, 2019

(54) BUILDING AUTOMATION SCHEDULING SYSTEM AND METHOD

(71) Applicant: Crestron Electronics, Inc., Rockleigh, NJ (US)

(72) Inventor: Doug Jacobson, Oradell, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 714 days.

(21) Appl. No.: 15/200,593

(22) Filed: Jul. 1, 2016

(65) Prior Publication Data

US 2018/0005195 A1    Jan. 4, 2018

(51) Int. Cl.
    G06Q 10/10    (2012.01)
    G05B 15/02    (2006.01)
    H04L 12/28    (2006.01)
    G06F 16/28    (2019.01)

(52) U.S. Cl.
    CPC ......... G06Q 10/1095 (2013.01); G05B 15/02 (2013.01); G06F 16/285 (2019.01); H04L 12/2816 (2013.01)

(58) Field of Classification Search
    CPC ......... G06Q 10/00; G06Q 40/06; G06F 17/60
    USPC ....................................................... 705/7.19
    See application file for complete search history.

(56) References Cited

U.S. PATENT DOCUMENTS

| 6,073,110 | A | 6/2000 | Rhodes et al. |
| 7,167,777 | B2 | 1/2007 | Budike, Jr. |
| 7,310,559 | B2 | 12/2007 | Walko, Jr. |
| 7,716,077 | B1 * | 5/2010 | Mikurak ................. G06Q 10/06 705/7.12 |
| 8,140,279 | B2 * | 3/2012 | Subbloie ................. G06Q 50/06 702/61 |
| 8,165,916 | B2 * | 4/2012 | Hoffberg ................. G05B 15/02 705/14.53 |
| 8,352,047 | B2 | 1/2013 | Walter |
| 8,396,608 | B2 * | 3/2013 | Subbloie ................... G06F 1/28 700/296 |
| 8,850,303 | B1 * | 9/2014 | Boehmer ......... G06Q 10/06311 715/224 |
| 9,412,138 | B2 * | 8/2016 | Foslien ................. G06Q 50/06 |
| 9,721,233 | B2 * | 8/2017 | Norton ............... G06Q 10/1093 |
| 9,740,188 | B2 * | 8/2017 | Fuller .................... G05B 15/02 |

(Continued)

FOREIGN PATENT DOCUMENTS

| WO | WO-2004102431 | A1 * | 11/2004 | ............. G06Q 10/06 |
| WO | WO-2012048384 | A1 * | 4/2012 | ............. G06Q 10/10 |

*Primary Examiner* — Romain Jeanty
(74) *Attorney, Agent, or Firm* — Crestron Electronics, Inc.

(57) ABSTRACT

A building automation scheduling system and method for scheduling the control of electronic devices of a building automation system. The room scheduling system comprises a database including a plurality of space nodes identifying spaces located within a building and associated with one or more electronic devices installed within respective spaces in the building. The room scheduling system further comprises a processor in communication with the one or more electronic devices configured for classifying the space nodes by room categories, defining room states each comprising at least one control command for one or more electronic devices in a space, defining day patterns by assigning at least one room state to at least one room category over a course of a day, and assigning the day patterns to calendar days on a calendar.

28 Claims, 21 Drawing Sheets

(56) References Cited

U.S. PATENT DOCUMENTS

| | | | |
|---|---|---|---|
| 2009/0083167 A1* | 3/2009 | Subbloie | G06Q 30/04 705/34 |
| 2010/0164736 A1* | 7/2010 | Byers | H04L 12/12 340/657 |
| 2010/0179850 A1 | 7/2010 | Fuller et al. | |
| 2012/0143378 A1 | 6/2012 | Spears et al. | |
| 2014/0265875 A1 | 9/2014 | Nelson et al. | |

* cited by examiner

BUILDING AUTOMATION SCHEDULING SYSTEM AND METHOD

BACKGROUND OF THE INVENTION

Technical Field

Aspects of the embodiments relate to building automation systems, and more specifically to building automation scheduling system and method for scheduling electronic devices of a building automation system.

Background Art

Building automation and management are ever evolving to provide consumers with convenient and simple control and monitoring of various mechanical and electrical equipment within a building through building automation systems (BAS), also known as building management systems (BMS) and energy management systems (EMS). Building automation systems provide comfort, convenience, simplicity and security, as well as lower energy costs. They generally utilize a network of sensor and control devices distributed throughout a residential or commercial building to control and provide information on the mechanical and electrical equipment within the building. The system can control and monitor heating, ventilation and air conditioning (HVAC), lighting, shading, security, appliances, door locks, and audiovisual (AV) equipment, among others, for every room in each facility.

Building management systems are implemented in buildings of varying degrees of complexity. In large scale buildings there may be thousands of devices dispersed in hundreds of rooms. Building management systems utilize complicated software to control these devices on-demand or to create individualized automated scheduled events, for example to configure climate set points, lighting scenes, and shade levels for occupied and vacated states in one or more rooms. Scheduling of events involves programming the behavior of each controllable device within a building for a particular period of time. For instance, fixtures in a commercial building can be scheduled to operate differently during work hours than after work hours. Often the programming software to set up those schedules can be very confusing, difficult to interpret, and not intuitive to use. Consequently, event scheduling has been a tedious process prone to errors due to vast amount of data entry and inability to usefully perceive and review the scheduled events. As a result, building managers spend a considerable amount of time scheduling automated events of a building.

While some current solutions attempt to simplify the event scheduling process, these are inadequate. Building automation system programming software often includes a time-clock component where various building aspects can be scheduled throughout the course of a day. Existing solutions are typically "event" based (e.g. turn on the lights in this room at 11:15 PM) and very "atomic" (e.g. setup of separate commands are needed to turn on the lights and also disable a sensor). For example, if a user wants the lights to turn on at a certain time and turned off at another time, the user would need to create two distinct events. There is no meaningful way to control the lights in between these two times. Hundreds or even thousands of events may be required to program the building automation system properly. While the existing systems may give custom and vast amount of control options, in most cases a majority of these control options are not even utilized. This occurs because the current event scheduling solutions are cumbersome and confusing to set up, and even more cumbersome to visualize. Therefore, any improvements that simplify the process and thereby reduce cost, time, and mistakes are beneficial to users.

Accordingly, a need has arisen for a building automation scheduling system and method that allow a user to program scheduled events to control a vast amount of electronic devices and spaces of a building automation system in an intuitive, quick, and simple way.

SUMMARY OF THE INVENTION

It is an object of the embodiments to substantially solve at least the problems and/or disadvantages discussed above, and to provide at least one or more of the advantages described below.

It is therefore a general aspect of the embodiments to provide a building automation scheduling system and method for scheduling electronic devices of a building automation system.

It is therefore a general aspect of the embodiments to provide a building automation scheduling system and method that allows a user to program scheduled events to control a vast amount of electronic devices and spaces of a building automation system in an intuitive, quick, and simple way.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments a room scheduling system is provided for scheduling electronic devices of a building automation system. The system comprises a database comprising a plurality of space nodes identifying spaces located within a building and associated with one or more electronic devices installed within respective spaces in the building. The system further comprises a processor in communication with the one or more electronic devices comprising a memory encoding one or more processor-executable instructions, which when executed by the at least one processor, cause acts to be performed comprising: classifying the space nodes by room categories; defining room states each comprising at least one control command for one or more electronic devices in a space; defining day patterns by assigning at least one room state to at least one room category over a course of a day; and assigning the day patterns to calendar days on a calendar.

The room categories may comprise one of lobbies, hallways, staircases, common areas, conference rooms, private offices, open offices, bathrooms, exterior, parking, and any combinations thereof. Each room state may comprise at least two control commands for at least two electronic devices installed in a space. According to some aspects of the embodiments, the processor may be further configured for transmitting control commands to the one or more electronic devices during a calendar day according to the assigned day pattern.

According to some aspects of the embodiments, the system may further comprise a user interface configured for displaying a list of selectable space nodes and a list of selectable room categories. The processor may be configured for: receiving a selection of a space node from the list of selectable space nodes; receiving a selection of a room category from the list of selectable room categories; associating the selected space node with the selected room category; and storing the associated in the database. According to another aspect of the embodiments, each of the plurality of space nodes may comprises descriptive information, wherein in classifying the space nodes by room categories the processor is configured for: storing a list of room categories; scanning through the descriptive information; and comparing the descriptive information to the list of stored categories.

According to some aspects of the embodiments, the database may comprise a plurality of predefined room states. Each of the predefined room states may comprise at least one setting for selection by a user. The room states may comprise a vacancy room state comprising a vacancy scene setting and a vacancy timeout setting for selection by a user, wherein the vacancy room state comprises at least one control command configured for enabling an occupancy sensor to operate in a vacancy mode where an electronic device in a space is set to a selected vacancy scene when the occupancy sensor determines that a space has been vacated for a selected vacancy timeout. The room states may also comprise an occupancy room state comprising an occupancy scene setting, a vacancy scene setting, and a vacancy timeout setting for selection by a user, wherein the occupancy room state comprises at least one control command configured for enabling an occupancy sensor to operate in an occupancy mode where an electronic device in a space is set to a selected occupancy scene when the occupancy sensor determines that the space is occupied and set to a selected vacancy scene when the occupancy sensor determines that the space has been vacated for a selected vacancy timeout.

According to further aspects of the embodiments, the room states may comprise a manual room state comprising an initial scene setting for selection by a user, wherein the manual room state comprises at least one control command configured for setting an electronic device in a space to a selected initial scene and enabling manual control of the electronic device in the space. Additionally, the room states may comprise a lockout room state comprising an initial scene setting for selection by a user, wherein the lockout room state comprises at least one control command configured for setting an electronic device in a space to a selected initial scene and disabling manual control of the electronic device in the space. The room states may further comprise a photocell room state comprising at least one control command configured for enabling a photocell to control an electronic device according to detected ambient light levels.

According to some aspects of the embodiments, the day patterns may comprise day patterns for a plurality of day types. The day patterns may comprise one of a normal day day-pattern, a weekend day-pattern, a holiday day pattern, a half day day-pattern, a late hours day-pattern, and any combinations thereof.

According to some aspects of the embodiments, the system may further comprise a user interface configured for displaying a list of the room states and day timelines each corresponding to a respective room category of the room categories and each comprising selectable time intervals. The processor may be further configured for: receiving a selection of a time interval on a day timeline of a selected room category; receiving a selection of a room state from the list of room states; associating the selected time interval, the selected room category, and the selected room states; and storing the association in the database. Each room state may be color coded, wherein the user interface is configured for displaying the selected time interval with a color corresponding to the selected room state.

According to some aspects of the embodiments, the calendar may comprise weekdays, weekends, and holidays. The processor may be further configured for: defining a weekday day pattern, a weekend day pattern, and a holiday day pattern by assigning for each day pattern at least one room state to at least one room category over a course of a day; automatically assigning the weekday day pattern to the weekdays on the calendar; automatically assigning the weekend day pattern to weekends on the calendar; and automatically assigning the holiday day pattern to holidays on the calendar. The weekend day pattern and the holiday day pattern may comprise a single day pattern. The system may comprise a user interface configured for allowing a user to choose the holidays included in the calendar. The system may further comprise a user interface configured for displaying the calendar, wherein each day pattern is color coded, wherein the user interface is configured for displaying the weekdays on the calendar with a first color corresponding to the weekday day pattern and displaying the weekends with a second color corresponding to the weekend day pattern.

According to some aspects of the embodiments, they system may comprise a user interface configured for displaying the calendar, wherein the calendar comprises day blocks associated with the calendar days. According to some aspects of the embodiments, each day pattern may be color coded, wherein the user interface is configured for displaying the day blocks with colors corresponding to respective day patterns. The user interface may comprise a list of the day patterns, and wherein the processor is further configured for: receiving a selection of a day block from the calendar; receiving a selection of a day pattern from the list of day patterns; associating a calendar day of the selected day block with the selected day pattern; and storing the association in the database. According to some aspects of the embodiments, each day pattern may be color coded such that the user interface is configured for displaying the selected day block with a color corresponding to the selected day pattern. According to some aspects of the embodiments, during a calendar day associated with the selected day block the processor is further configured for transmitting control commands to the one or more electronic devices to operate according to the selected day pattern.

According to another aspect of the embodiments, a method is provided for scheduling electronic devices of a building automation system. The method comprise: storing a plurality of space nodes identifying spaces located within a building and associated with one or more electronic devices installed within respective spaces in the building; classifying the space nodes by room categories; defining room states each comprising at least one control command for one or more electronic devices in a space; defining day patterns by assigning at least one room state to at least one room category over a course of a day; and assigning the day patterns to calendar days on a calendar.

According to another aspect of the embodiments, a method is provided for scheduling electronic devices of a building automation system comprising: storing a plurality of space nodes identifying spaces located within a building and associated with one or more electronic devices installed within respective spaces in the building; storing a calendar comprising weekdays, weekends, and holidays; classifying the space nodes by room categories; defining room states each comprising at least two control commands for at least two electronic devices installed in a space; defining a weekday day pattern, a weekend day pattern, and a holiday day pattern by assigning for each day pattern at least one room state to at least one room category over a course of a day; automatically assigning the weekday day pattern to the weekdays on the calendar; automatically assigning the weekend day pattern to weekends on the calendar; automatically assigning the holiday day pattern to holidays on the calendar; and transmitting control commands to the one or more electronic devices during a calendar day according to the assigned day pattern.

According to another aspect of the embodiments, a room scheduling system is provided for scheduling electronic devices of a building automation system. The system comprises a memory configured for storing a plurality of space nodes identifying spaces located within a building and associated with one or more electronic devices installed within respective spaces in the building. The system further comprises a room categories module configured for classifying the space nodes by room categories; a room states module configured for defining room states, wherein each room state comprises at least one control command for one or more electronic devices in a space; a day pattern module configured for defining day patterns by assigning at least one room state to at least one room category over a course of a day; and a calendar module configured for assigning the day patterns to calendar days on a calendar.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

Figure 1:
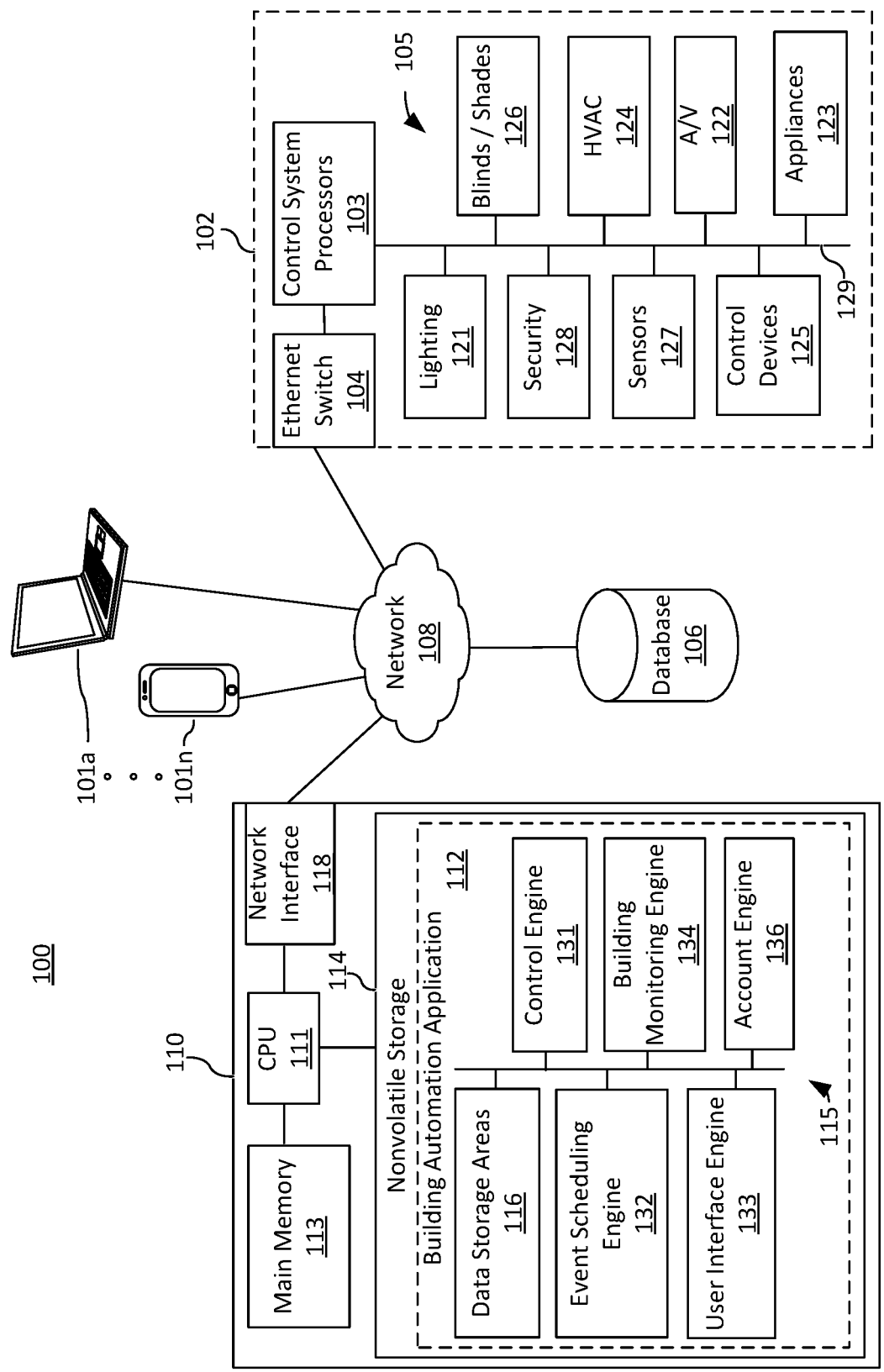

Brief Description of the Several Views of the Drawing

Figure 2:
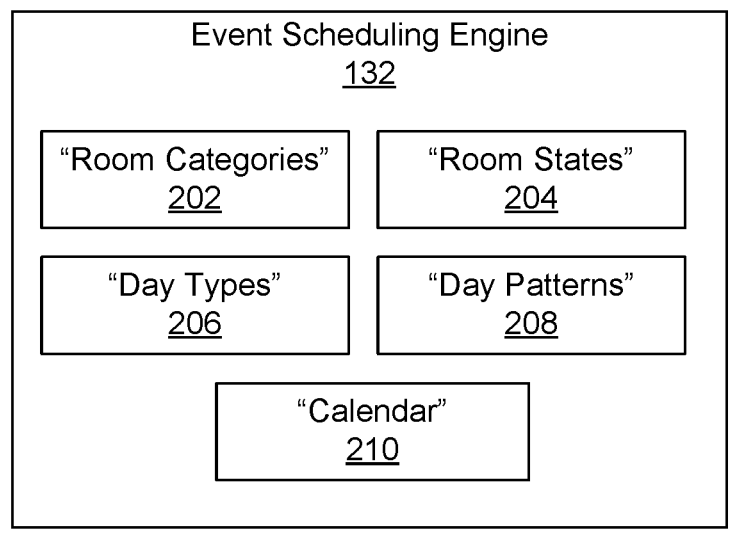
Figure 3:
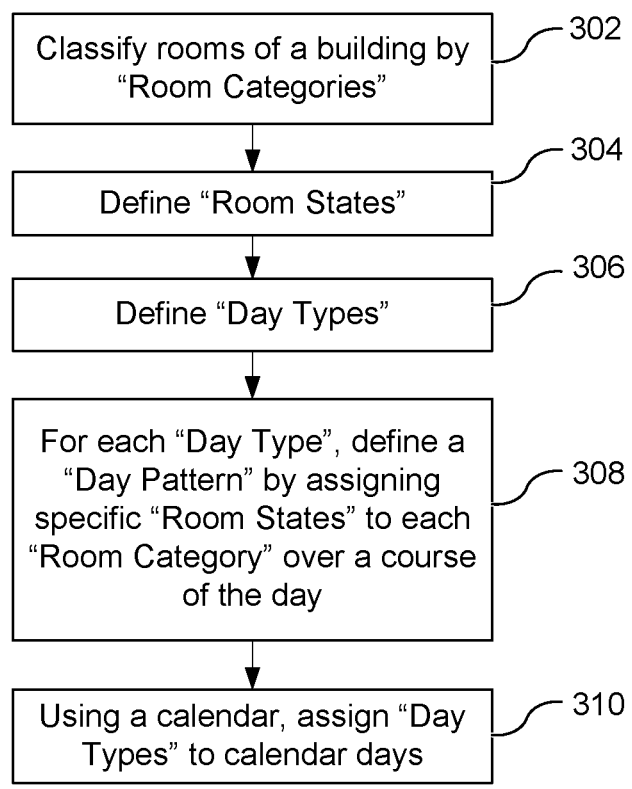
Figure 4:
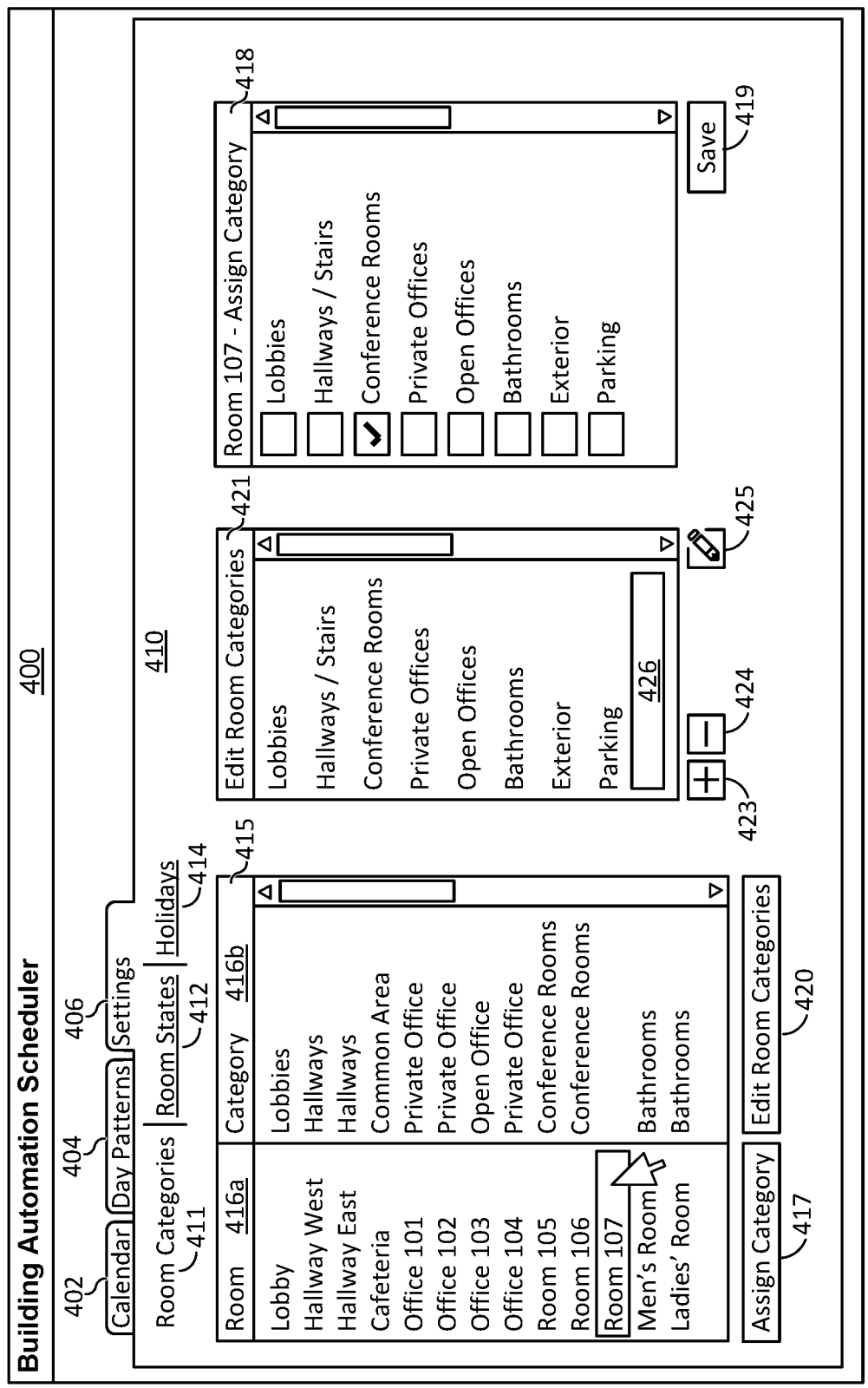
Figure 5:
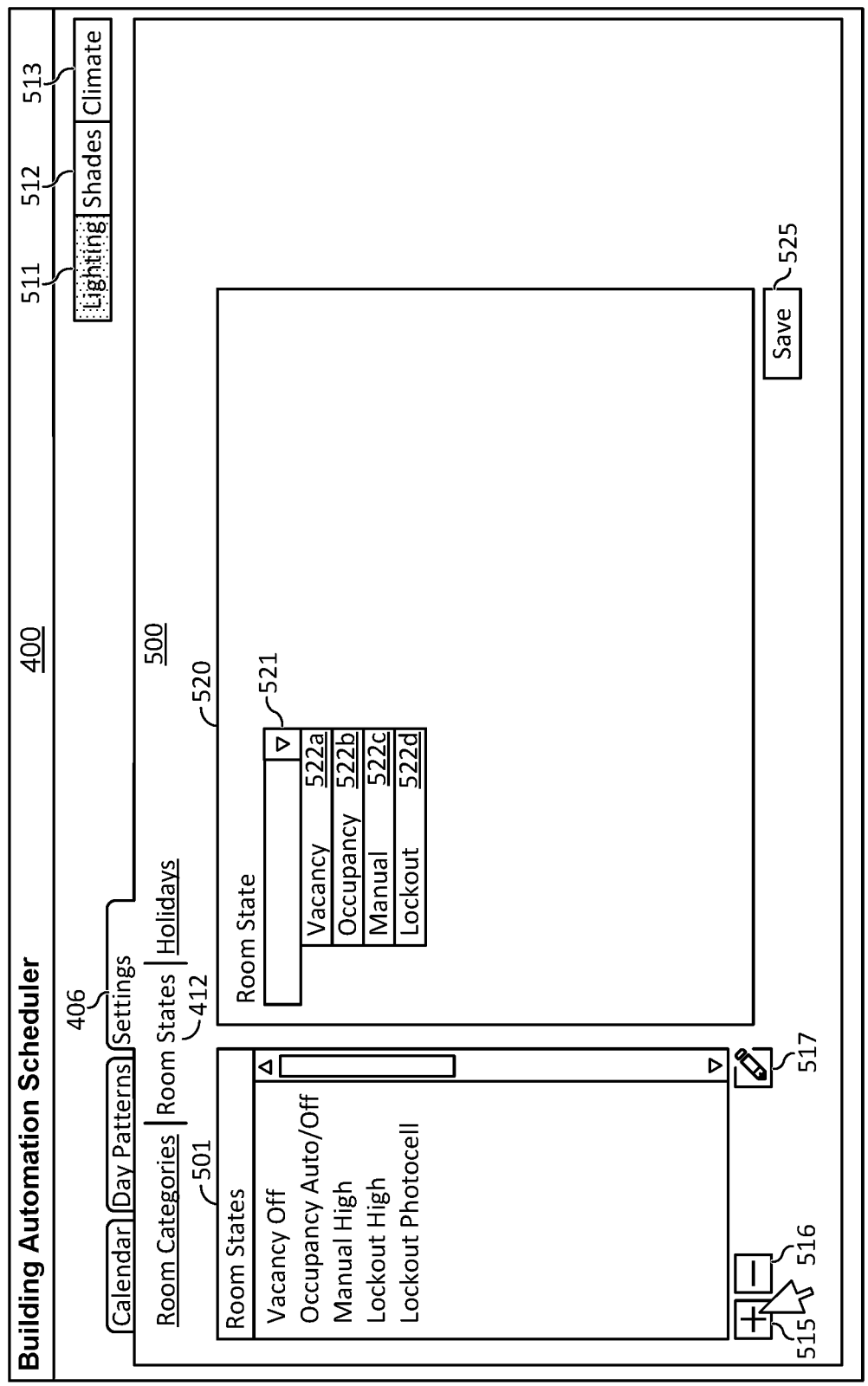
Figure 6:
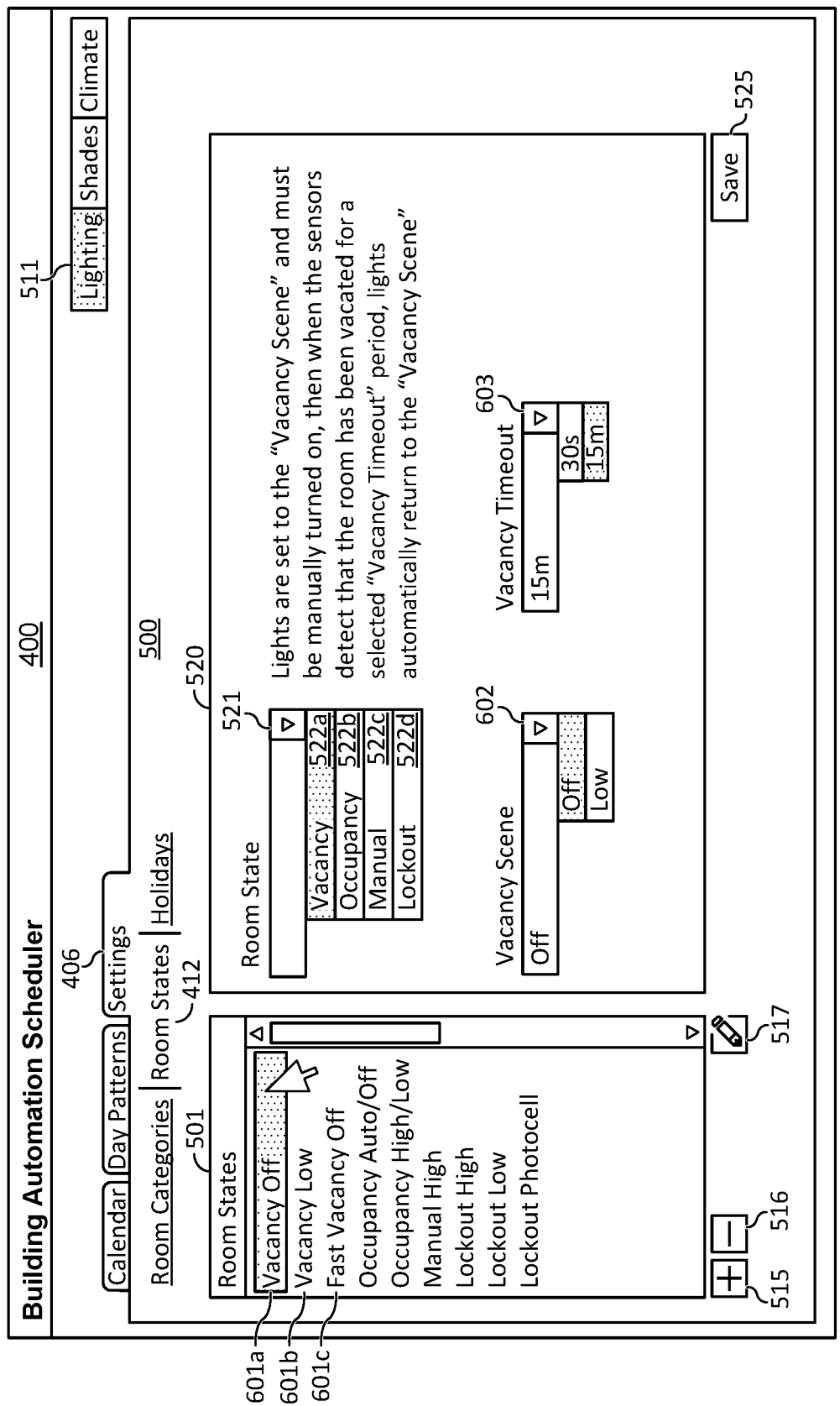
Figure 7:
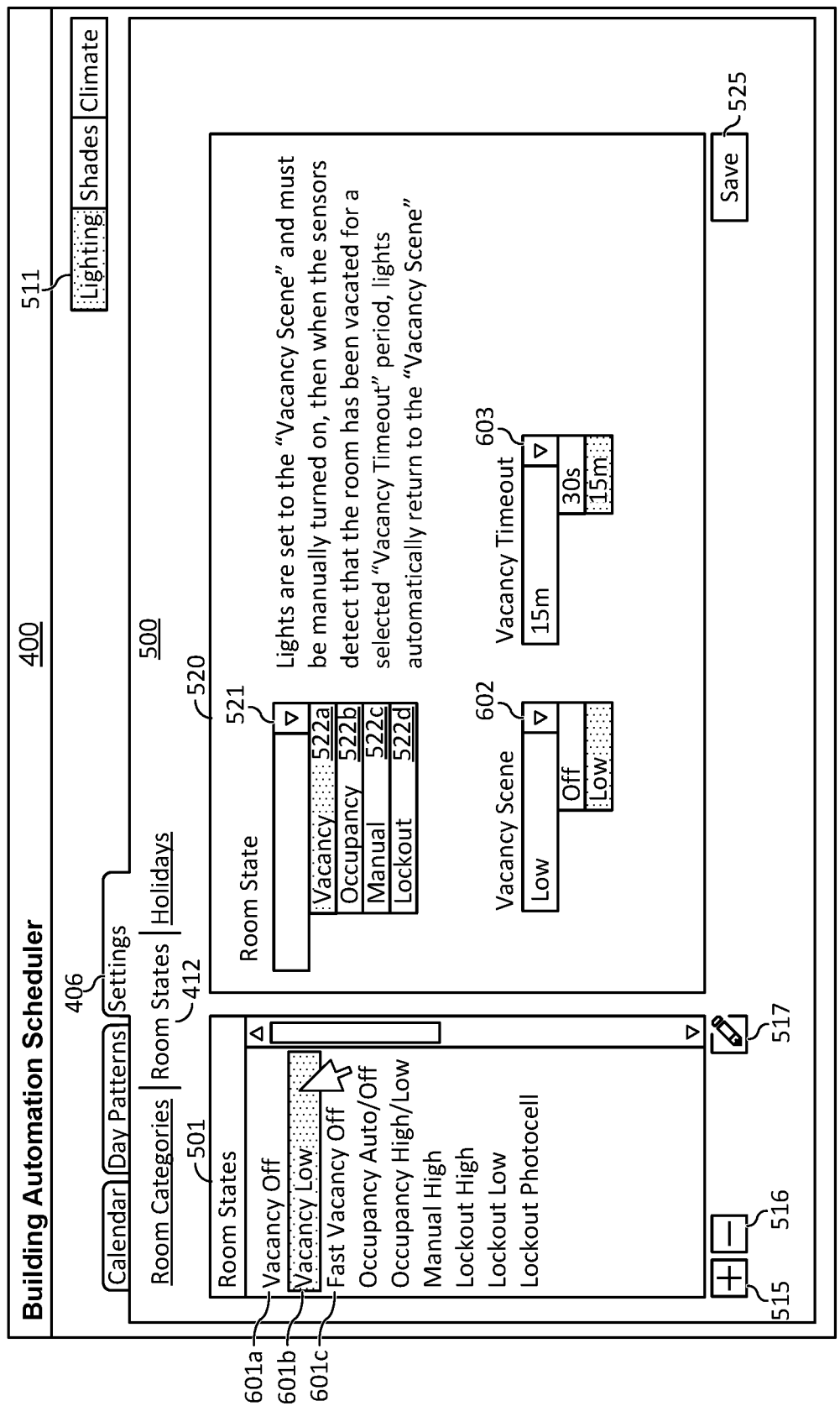
Figure 8:
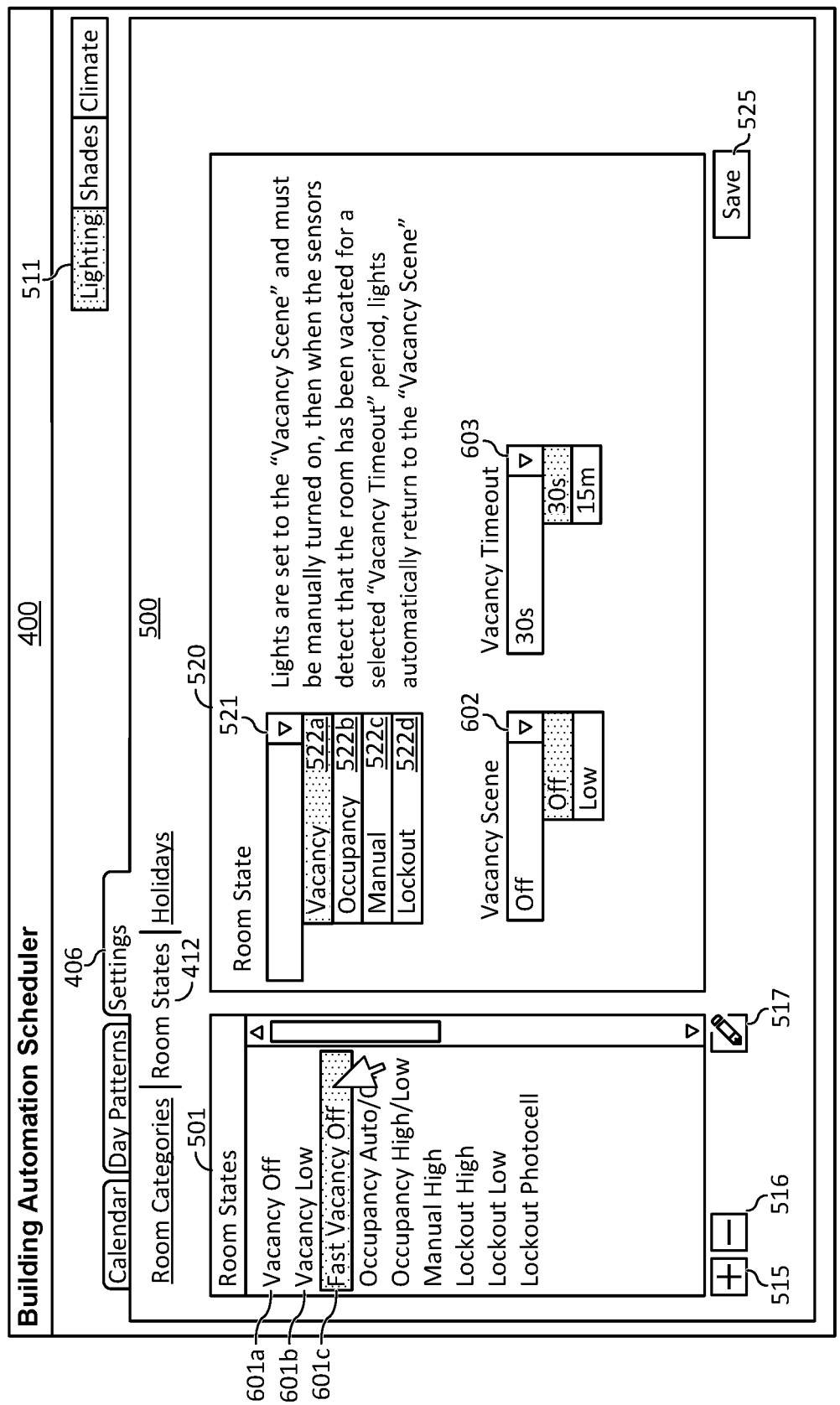
Figure 9:
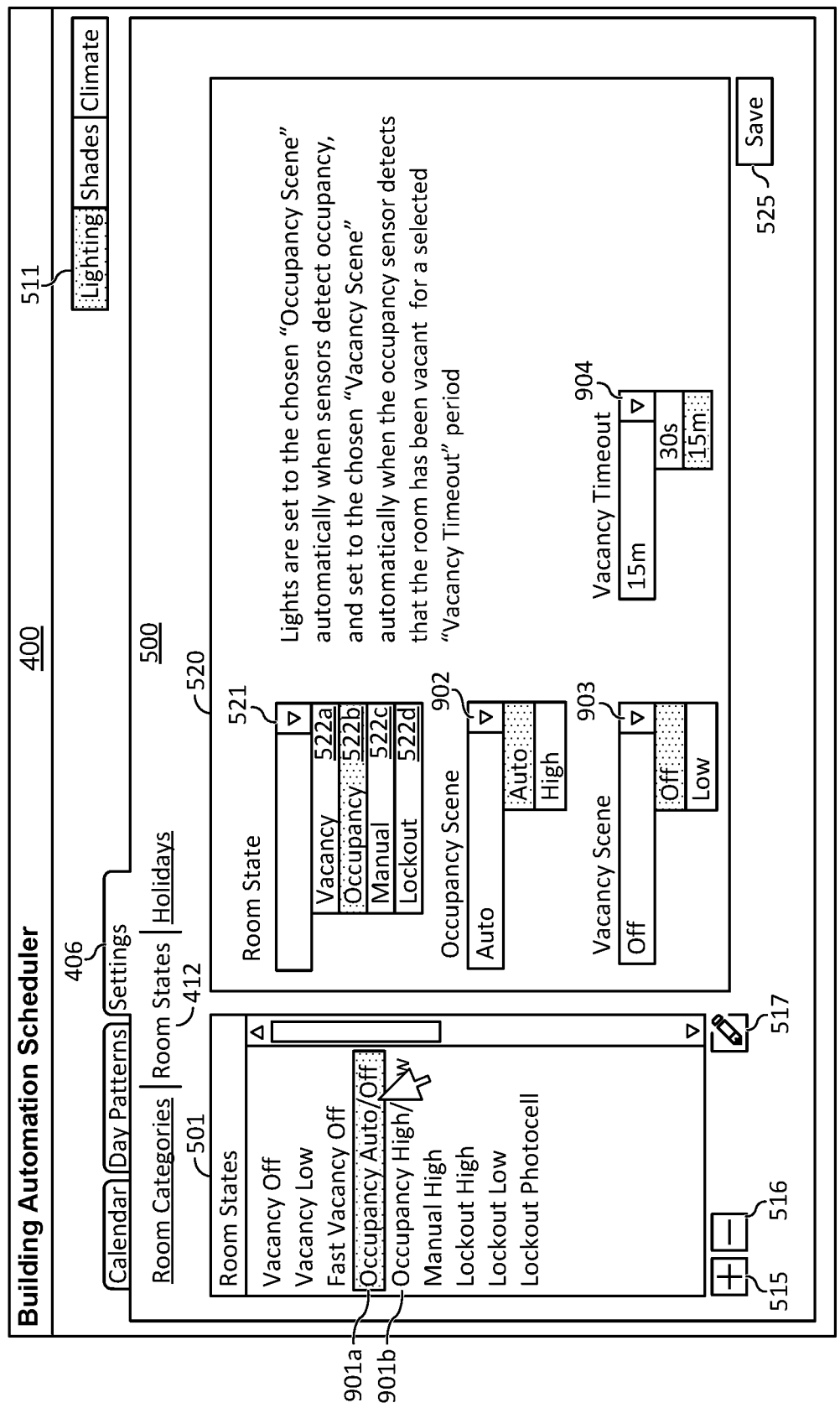
Figure 10:
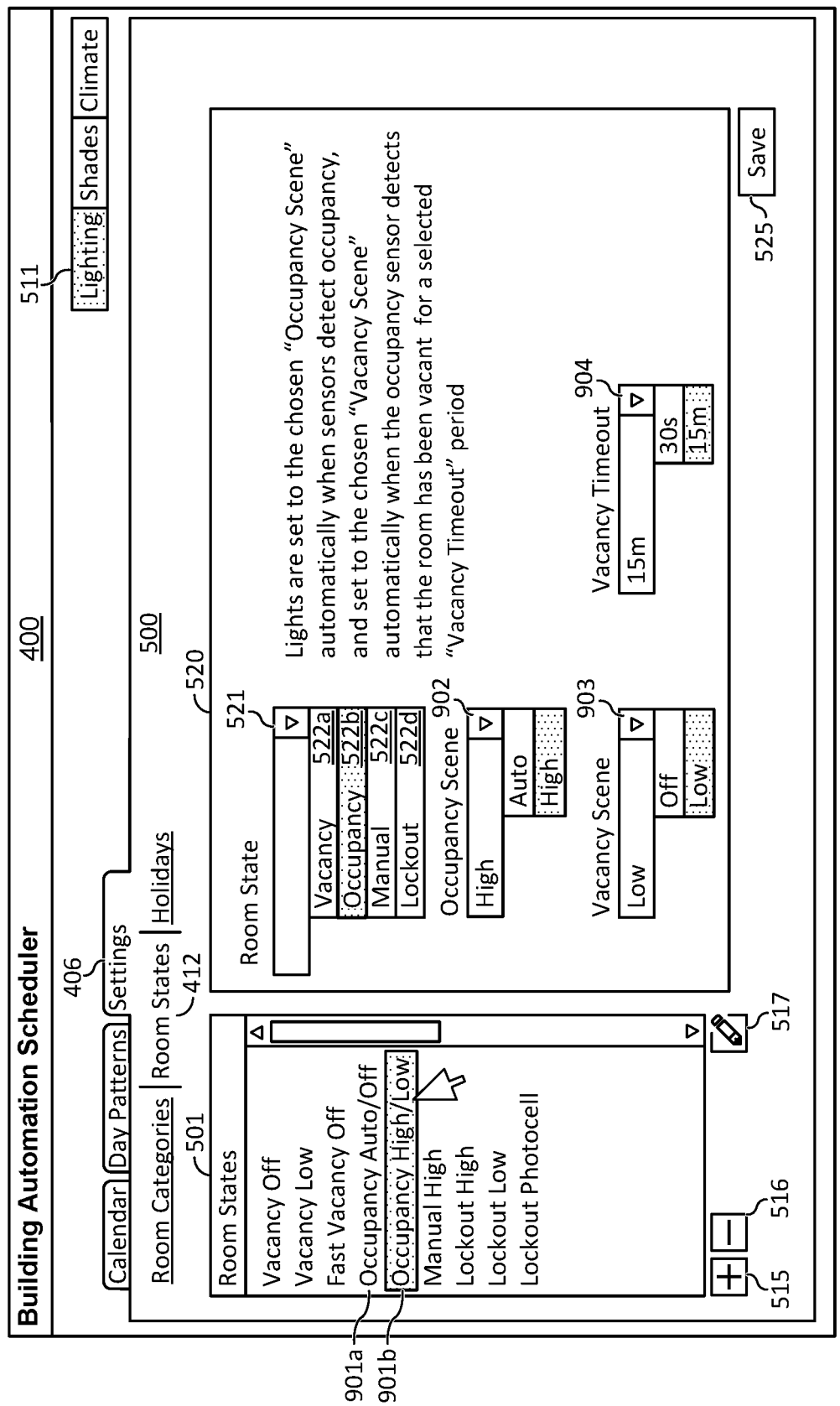
Figure 11:
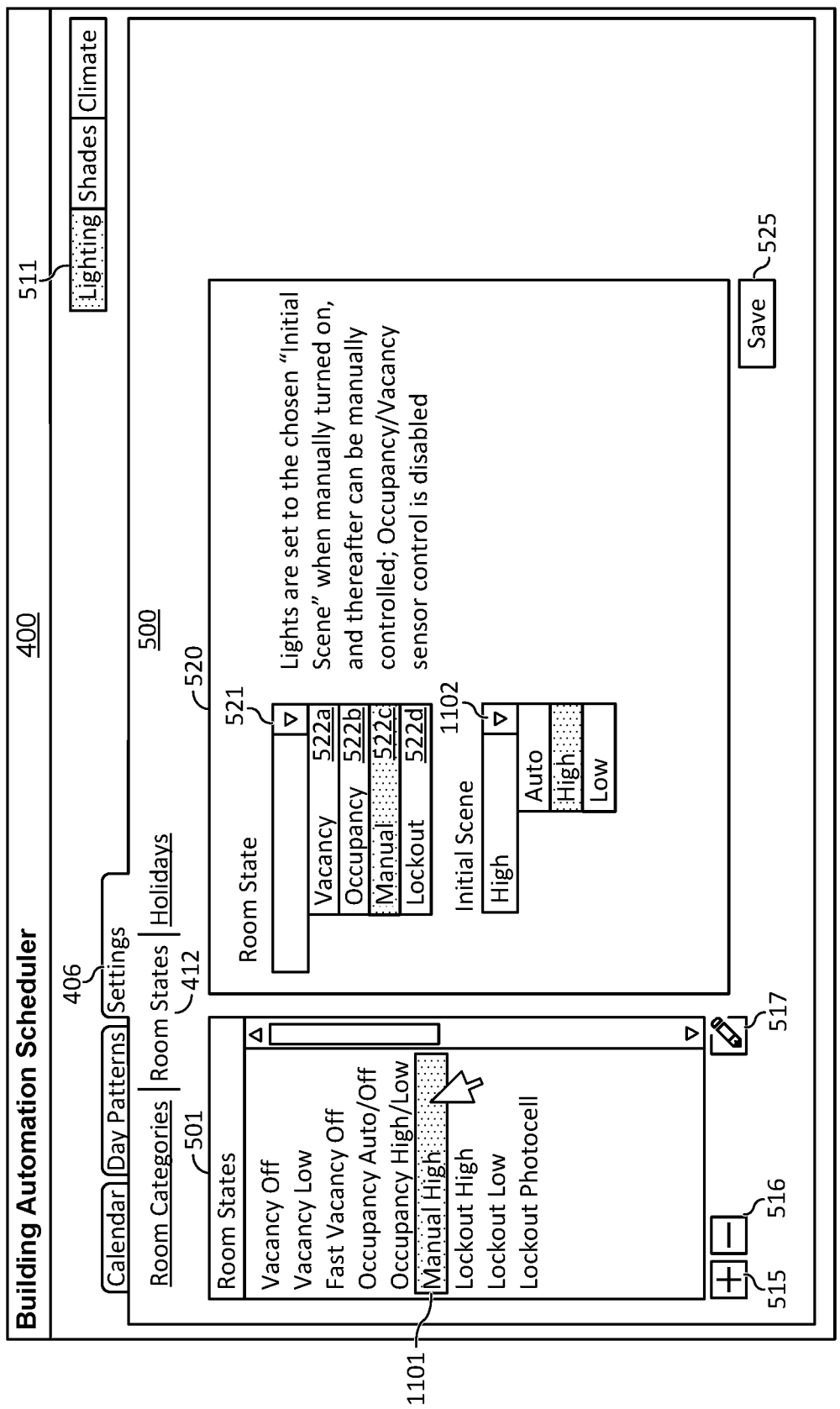
Figure 12:
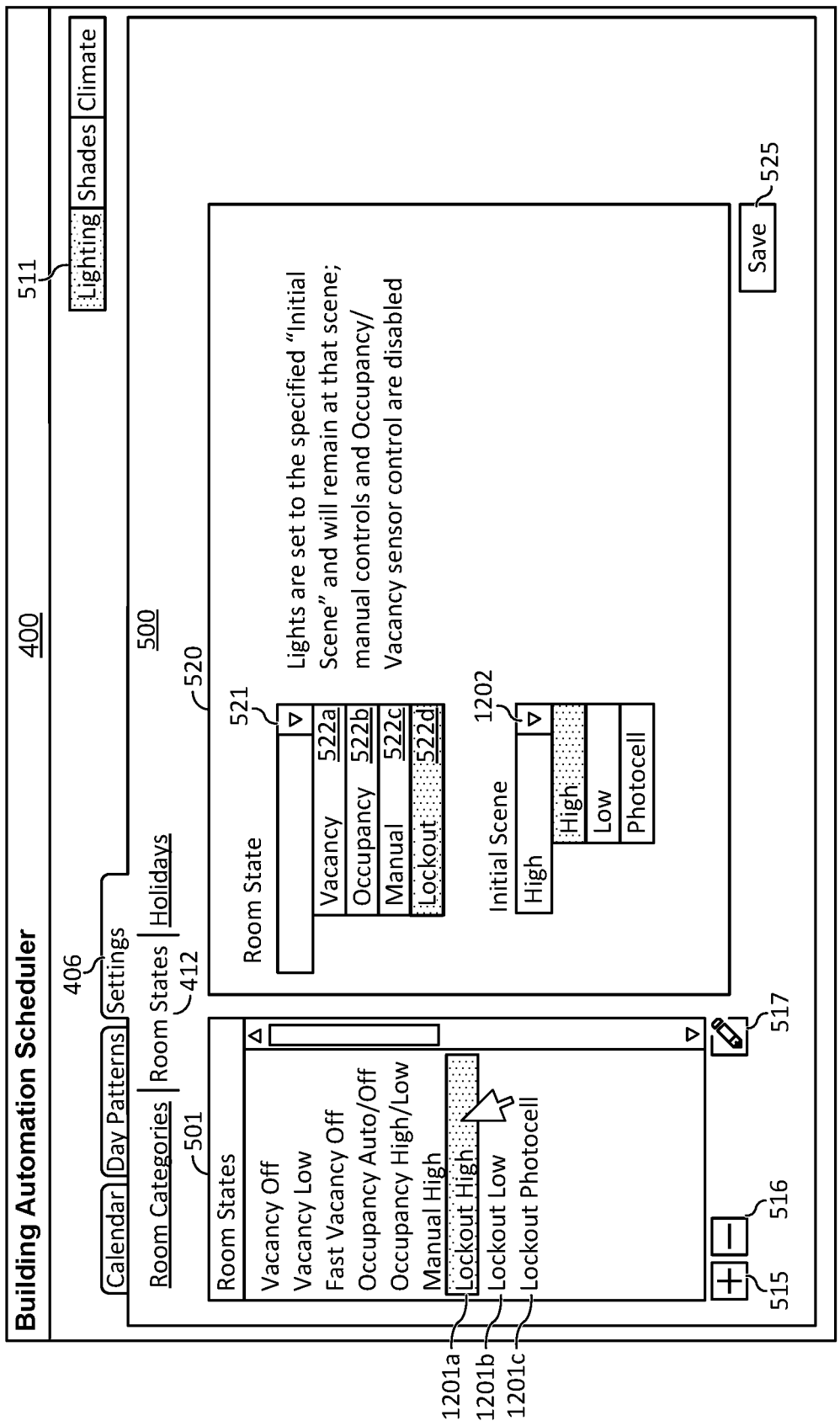
Figure 13:
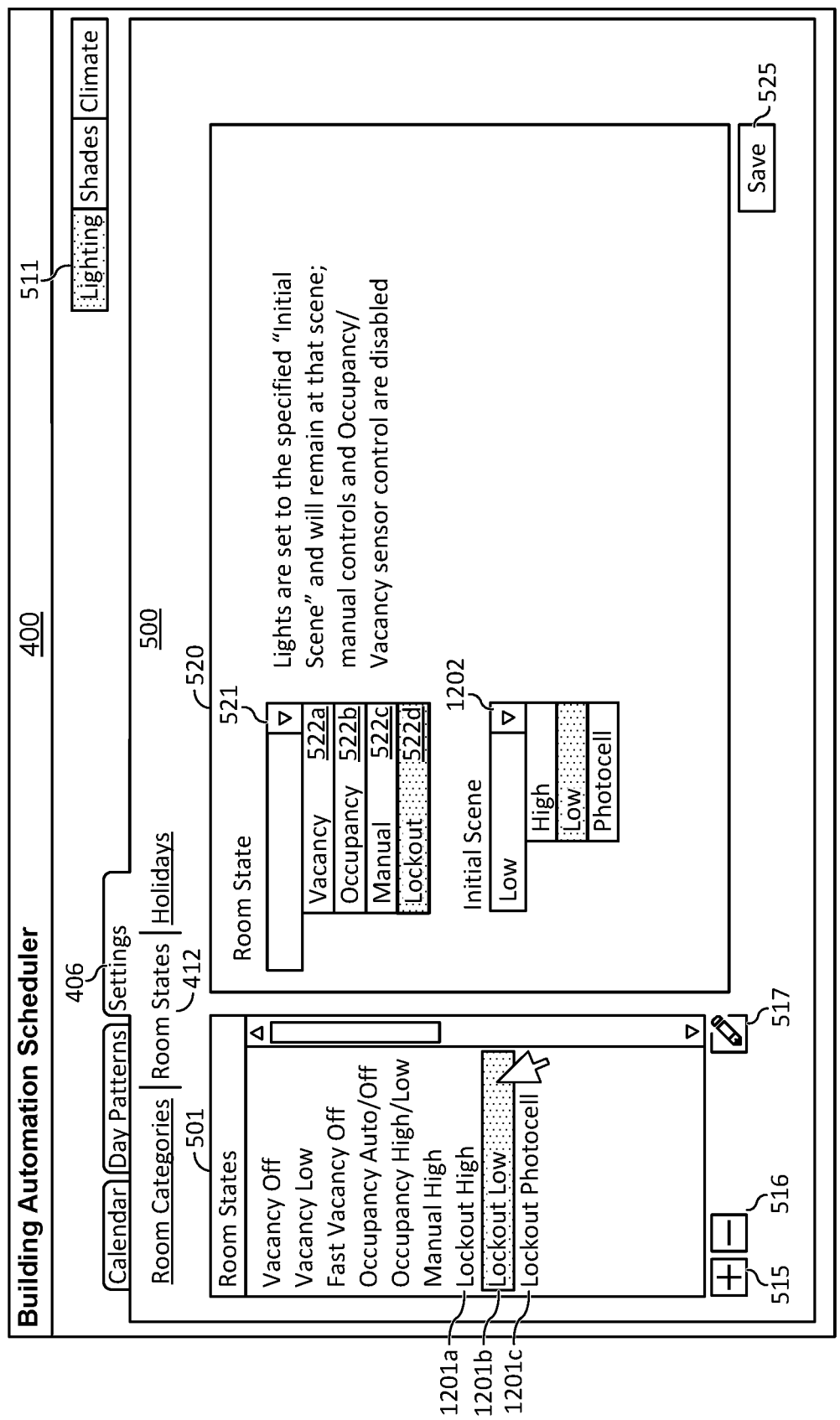
Figure 14:
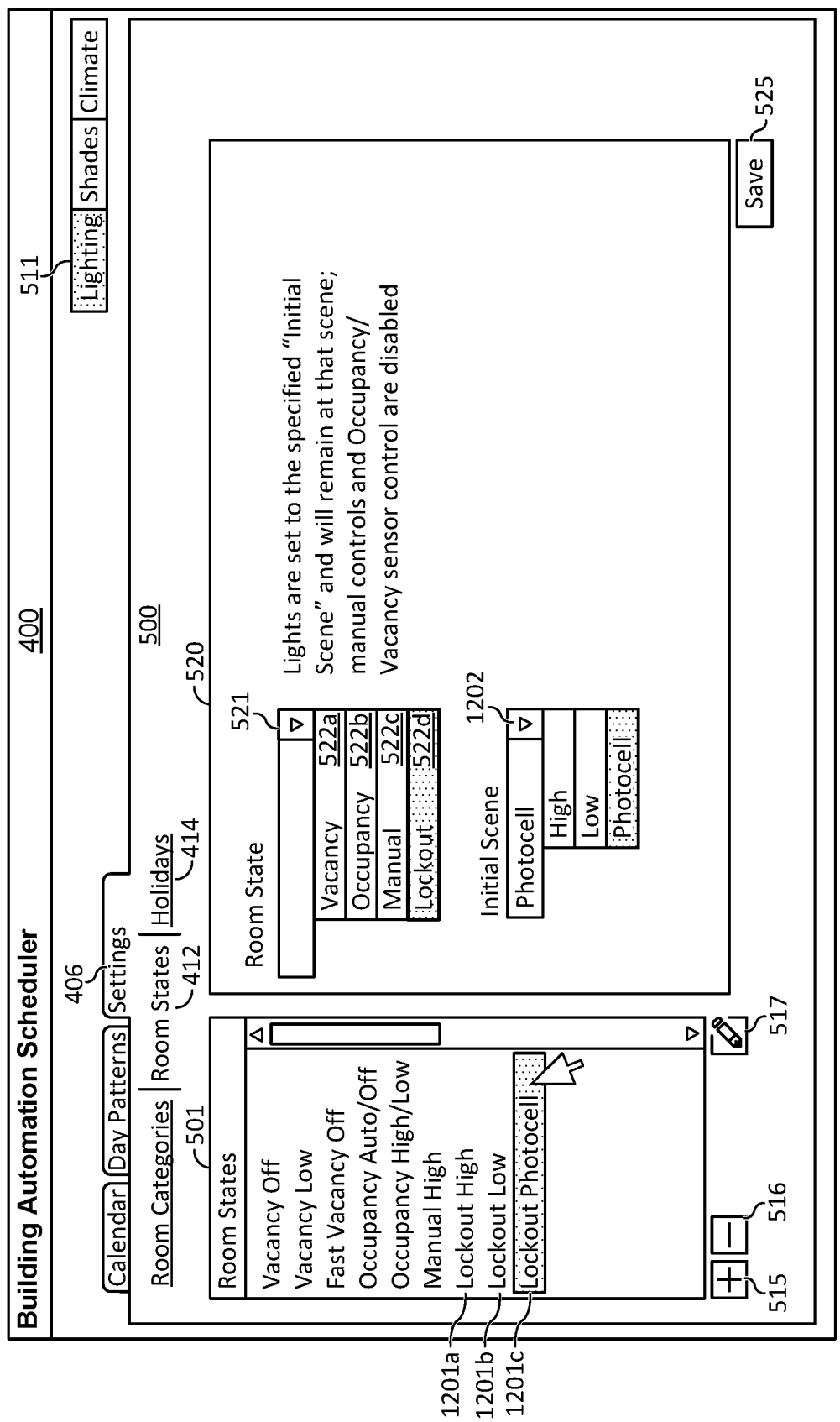
Figure 15:
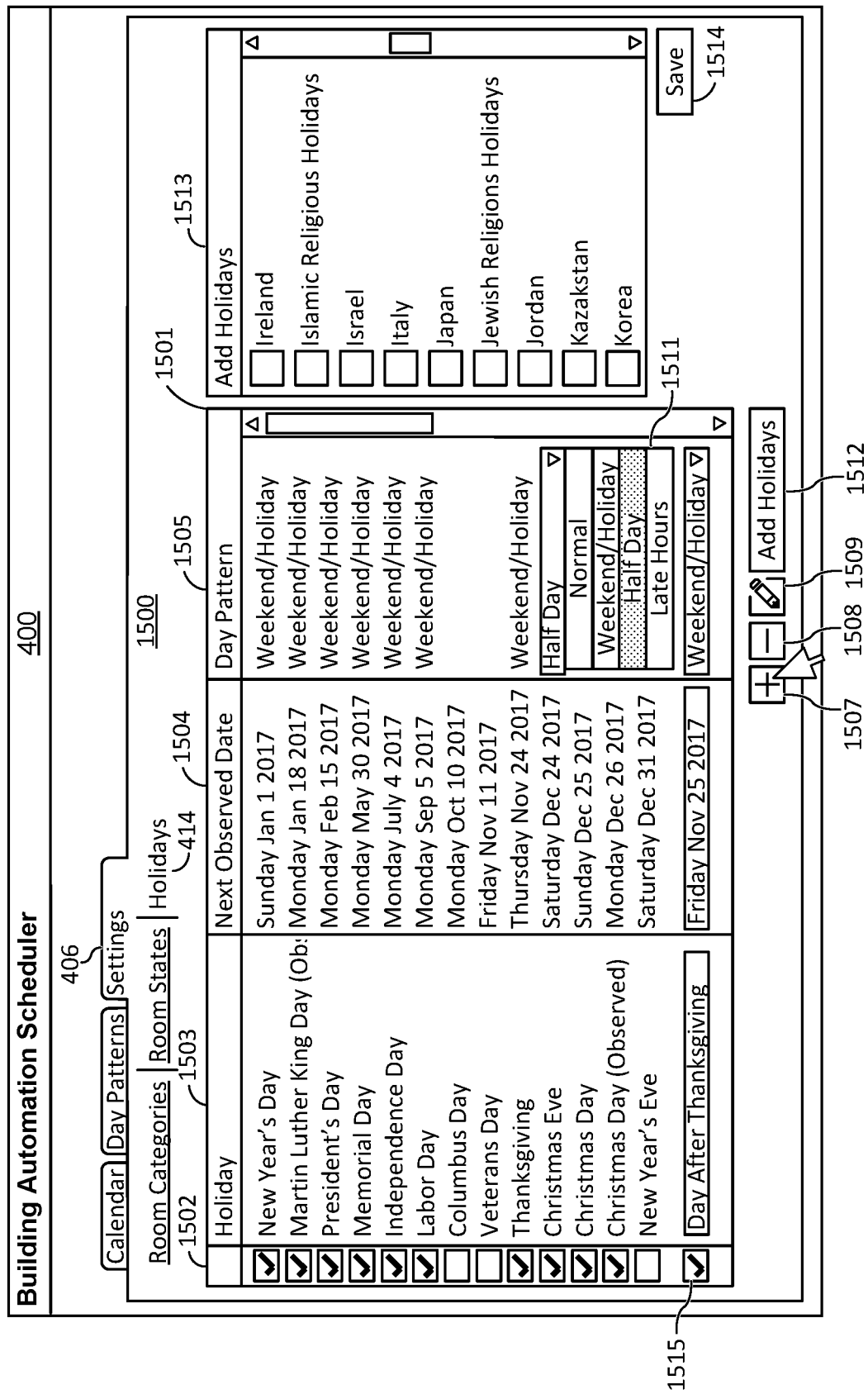
Figure 16:
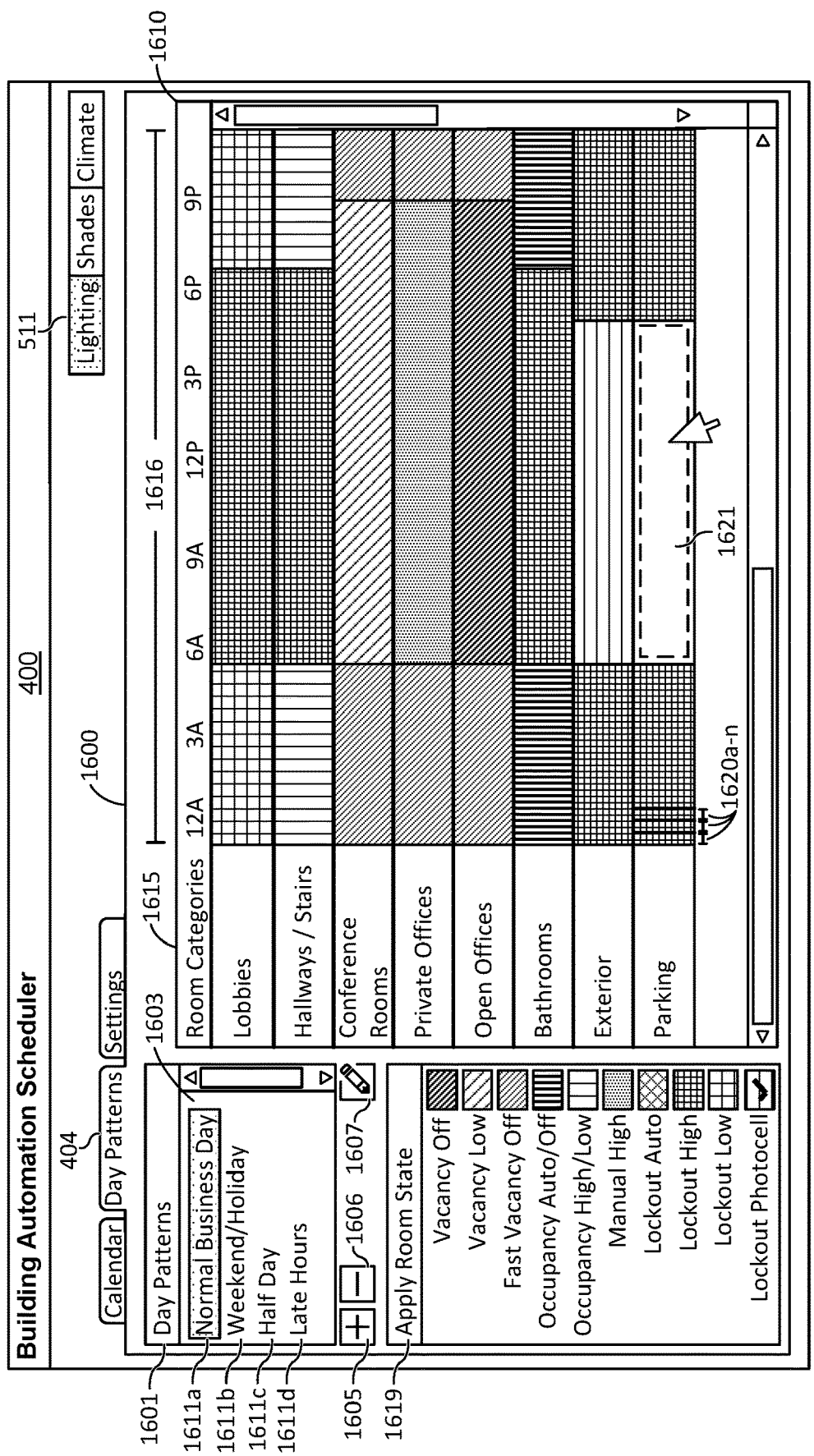
Figure 17:
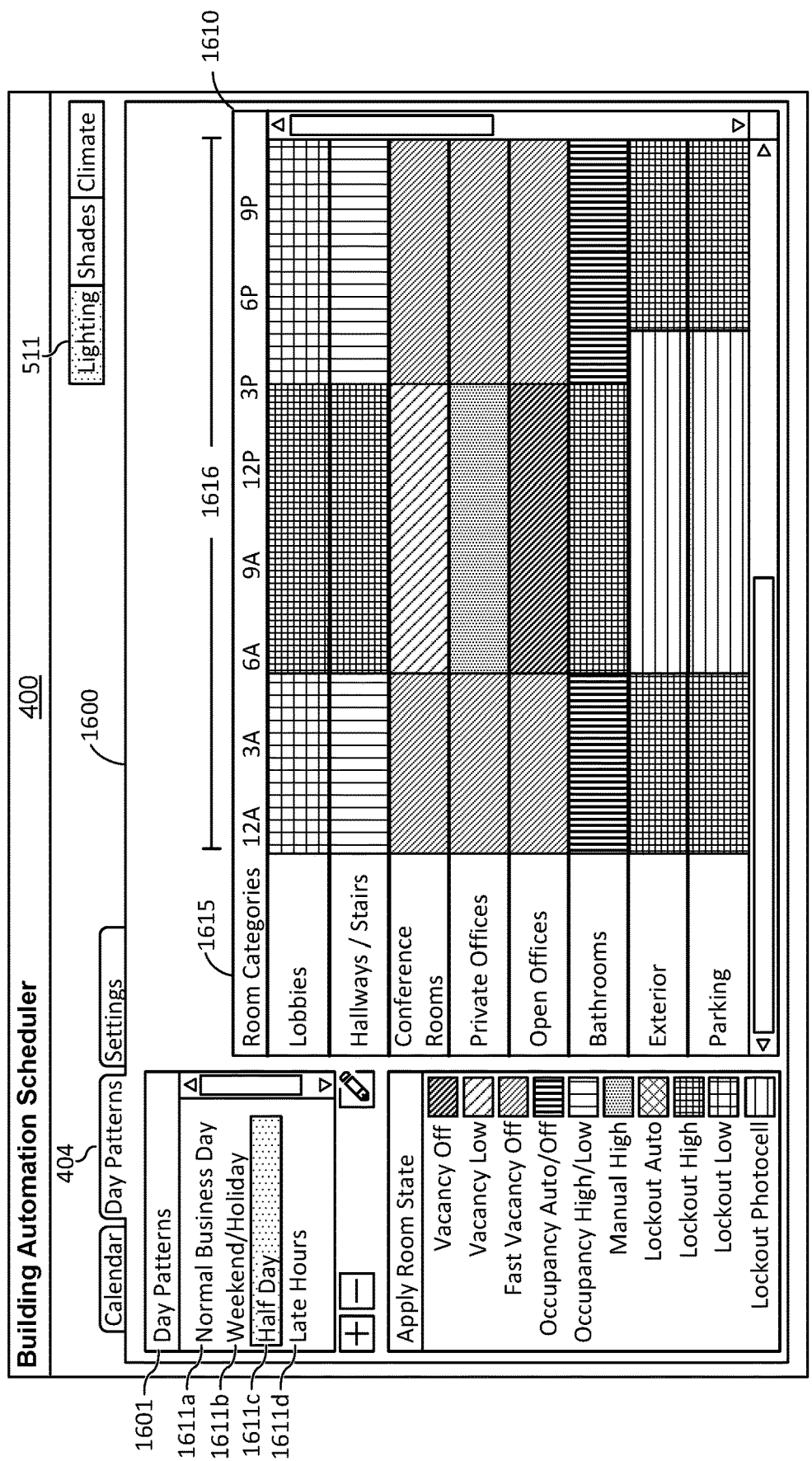
Figure 18:
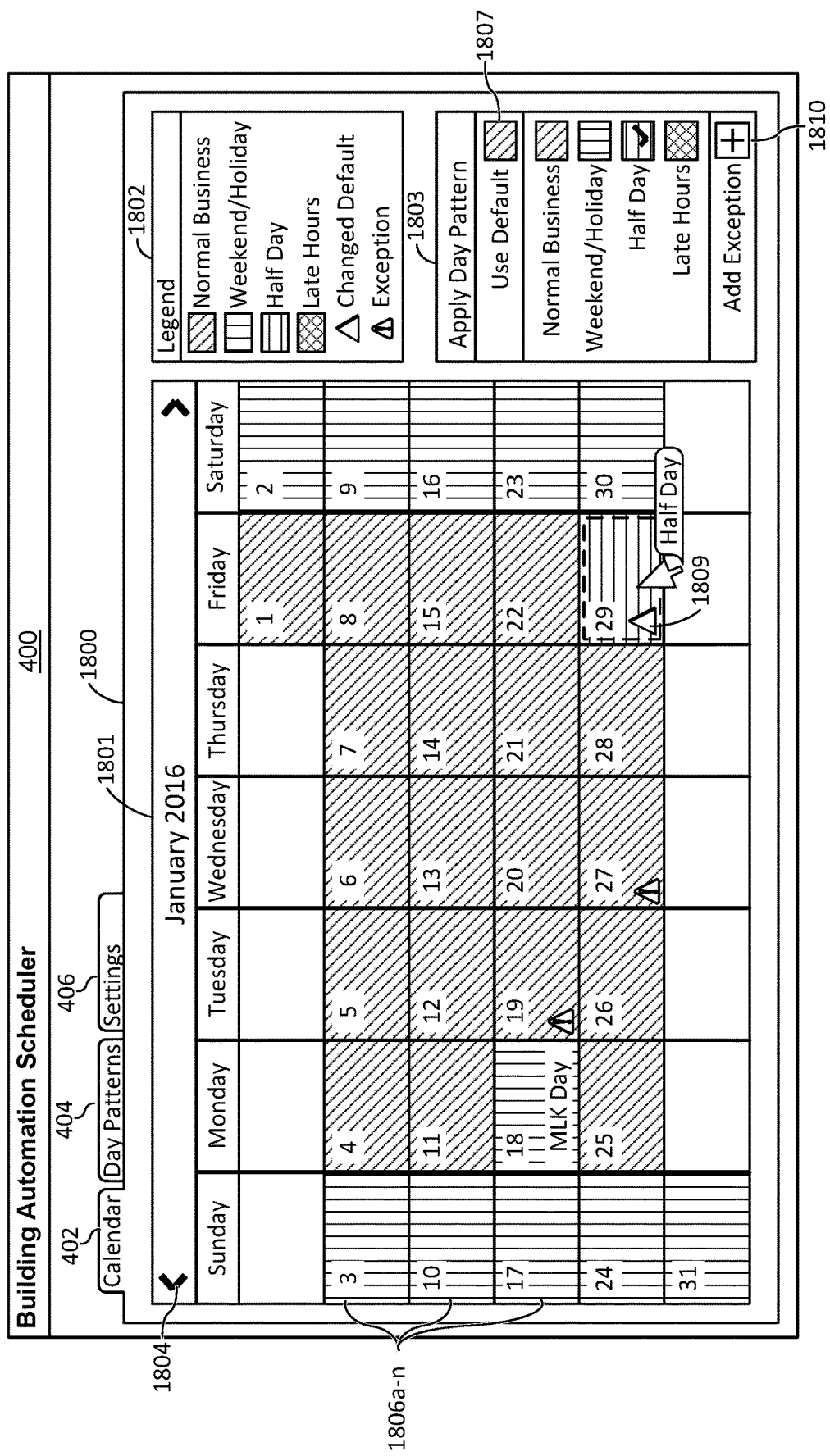
Figure 19:
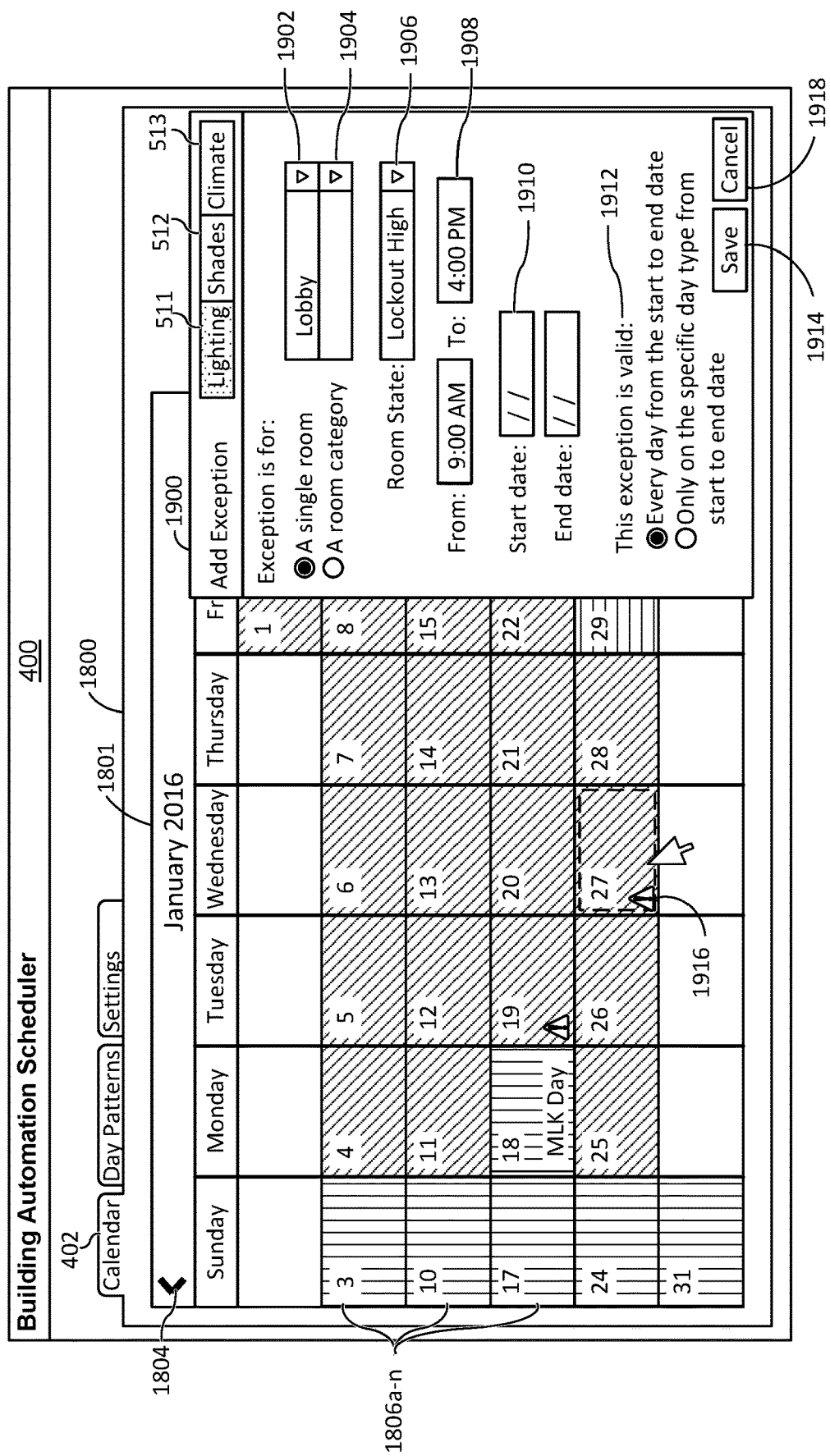
Figure 20:
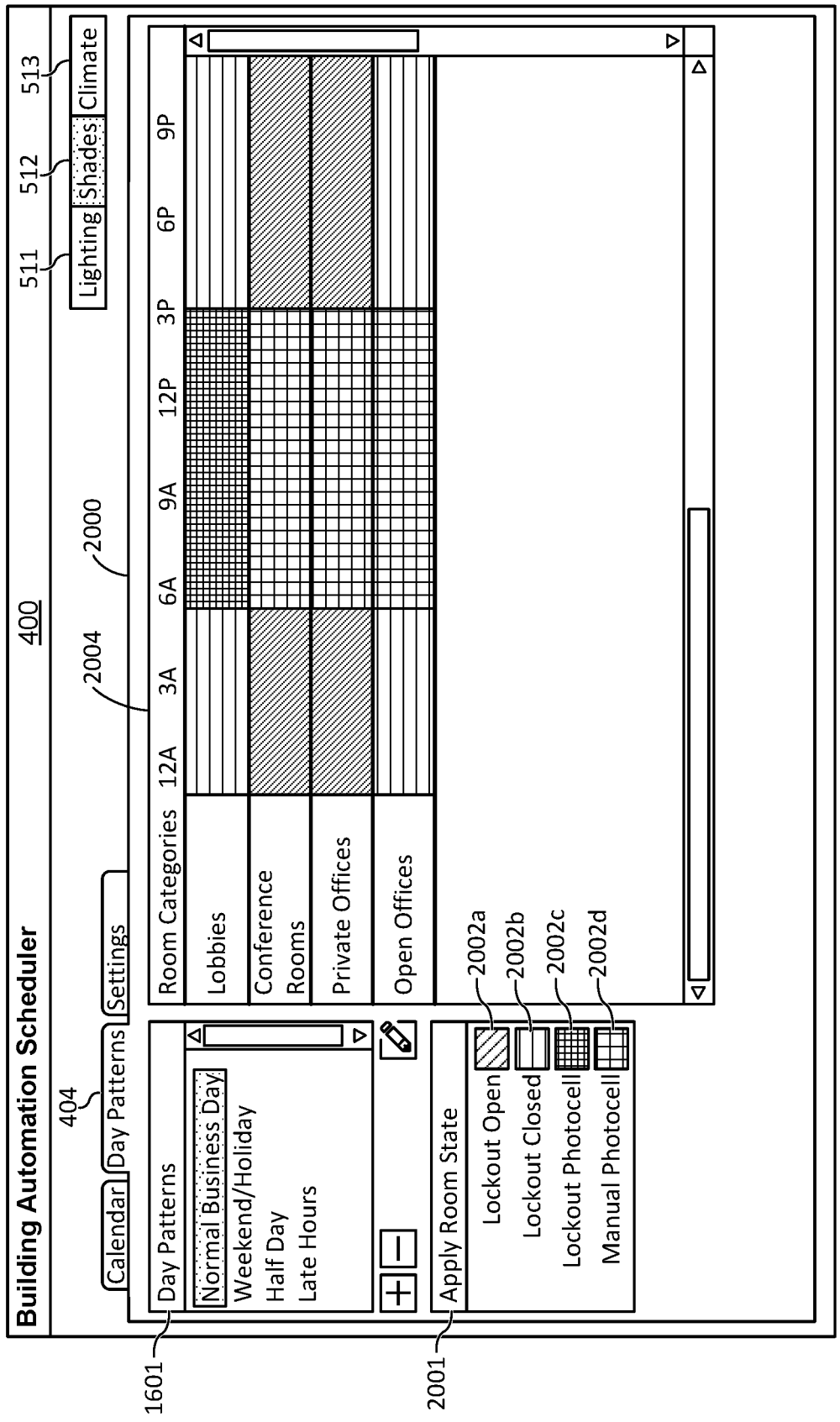
Figure 21:
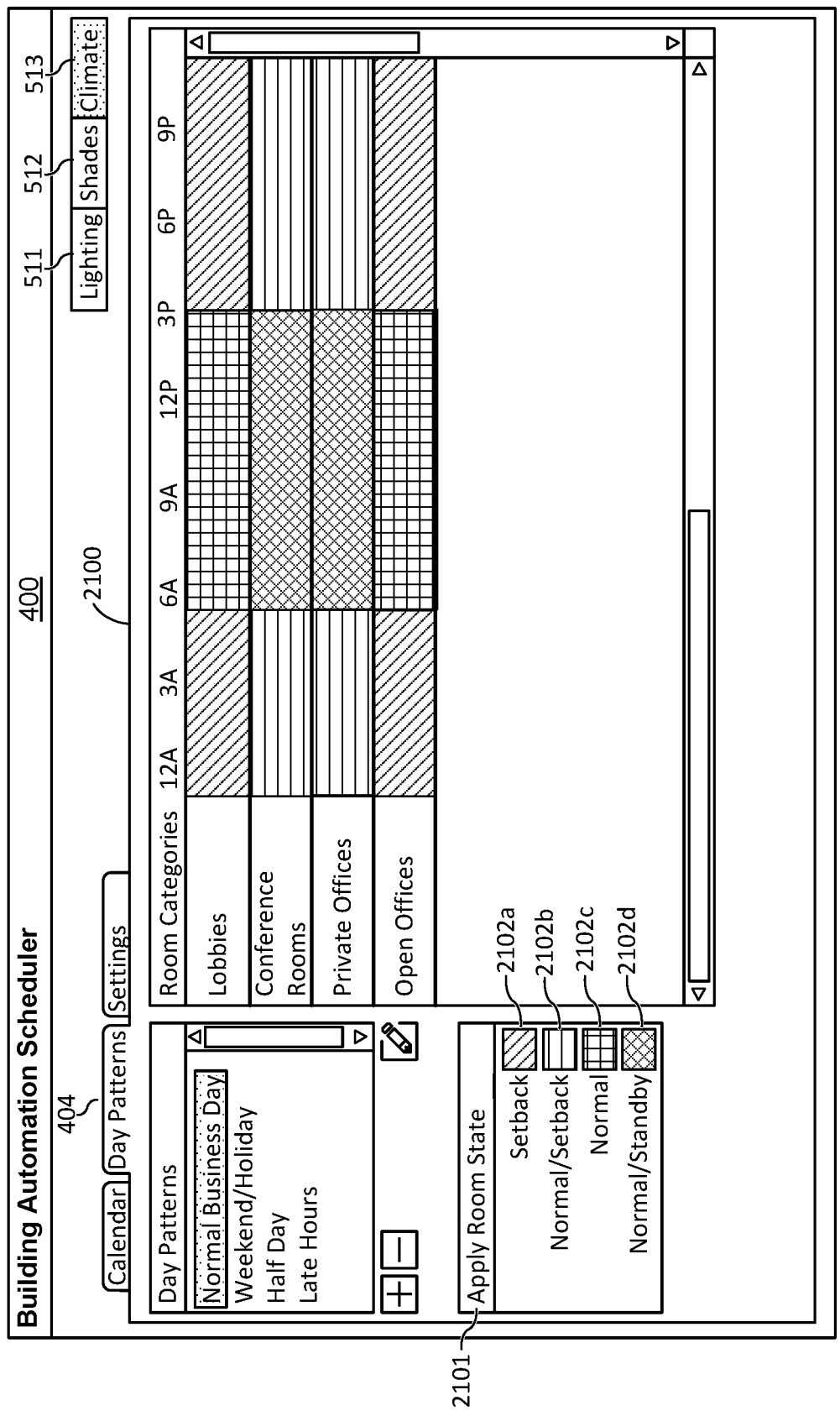

FIG. 1 illustrates a block diagram depicting a building automation system for controlling and managing one or more buildings according to an embodiment;

FIG. 2 illustrates a schematic diagram of a plurality of software modules of an event scheduling engine of a building automation application according to an embodiment;

FIG. 3 illustrates a flowchart showing the process for scheduling electronic devices of a building automation system according to an embodiment;

FIG. 4 illustrates a schematic diagram depicting a room categories settings view of a "Building Automation Scheduler" page of the building automation application according to an embodiment;

FIG. 5 illustrates a schematic diagram depicting a room states settings view of the "Building Automation Scheduler" page of the building automation application according to an embodiment;

FIG. 6 illustrates a schematic diagram depicting a "Vacancy Off" room state configuration according to an embodiment;

FIG. 7 illustrates a schematic diagram depicting a "Vacancy Low" room state configuration according to an embodiment;

FIG. 8 illustrates a schematic diagram depicting a "Fast Vacancy Off" room state configuration according to an embodiment;

FIG. 9 illustrates a schematic diagram depicting an "Occupancy Auto/Off" room state configuration according to an embodiment;

FIG. 10 illustrates a schematic diagram depicting an "Occupancy High/Low" room state configuration according to an embodiment;

FIG. 11 illustrates a schematic diagram depicting a "Manual High" room state configuration according to an embodiment;

FIG. 12 illustrates a schematic diagram depicting a "Lockout High" room state configuration according to an embodiment;

FIG. 13 illustrates a schematic diagram depicting a "Lockout Low" room state configuration according to an embodiment;

FIG. 14 illustrates a schematic diagram depicting a "Lockout Photocell" room state configuration according to an embodiment;

FIG. 15 illustrates a schematic diagram depicting a holidays settings view of the "Building Automation Scheduler" page of the building automation application according to an embodiment;

FIG. 16 illustrates a schematic diagram depicting a lighting normal business day pattern view of the "Building Automation Scheduler" page of the building automation application according to an embodiment;

FIG. 17 illustrates a schematic diagram depicting a lighting half day pattern view of the "Building Automation Scheduler" page of the building automation application according to an embodiment;

FIG. 18 illustrates a schematic diagram depicting a calendar view of the "Building Automation Scheduler" page of the building automation application according to an embodiment;

FIG. 19 illustrates a schematic diagram depicting a calendar view with an add exception window of the "Building Automation Scheduler" page of the building automation application according to an embodiment;

FIG. 20 illustrates a schematic diagram depicting a shades normal business day pattern view of the "Building Automation Scheduler" page of the building automation application according to an embodiment; and FIG. 21 illustrates a schematic diagram depicting a climate normal business day pattern view of the "Building Automation Scheduler" page of the building automation application according to an embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order

The following is a list of the major elements in the drawings in numerical order.
100 Building Automation System
101a-n User Communication Devices
102 Building
103 Control System Processors
104 Ethernet Switch
105 Electronic Devices
106 Database
108 Communication Network
110 Server
111 Central Processing Unit
112 Building Automation Application
113 Main Memory
114 Nonvolatile Storage
115 Software Engines
116 Data Storage Areas
118 Network Interface
121 Lighting Devices
122 AV Devices
123 Appliances
124 HVAC Devices
125 Control Devices
126 Shading Devices
127 Sensors
128 Security Devices
129 Local Area Network
131 Control Engine
132 Event Scheduling Engine
133 User Interface Engine
134 Building Monitoring Engine
136 Account Engine
202 "Room Categories" Module
204 "Room States" Module
206 "Day Types" Module
208 "Day Patterns" Module
210 "Calendar" Module
300 Flowchart Showing the Process for Scheduling Electronic Devices of a Building Automation System
302-310 Steps of Process 300
400 "Building Automation Scheduler" Page
402 "Calendar" Tab
404 "Day Patterns" Tab
406 "Settings" Tab
410 Room Categories Settings View
411 "Room Categories" Tab
412 "Room States" Tab
414 "Holidays" Tab
415 Room Category Table
416a "Room" Column
416b "Category" Column
417 "Assign Category" Button
418 "Assign Category" Window
419 "Save" Button
420 "Edit Room Categories" Button
421 "Edit Room Categories" Window
423 Add Icon Button
424 Delete Icon Button
425 Edit Icon Button
426 Text Field
500 Room States Settings View
501 "Room States" Window
511 "Lighting" Tab
512 "Shades" Tab
513 "Climate" Tab
515 Add Icon Button
516 Delete Icon Button
517 Edit Icon Button
520 Room State Configuration Window
521 Room States Drop-Down Menu
522a "Vacancy" Room State
522b "Occupancy" Room State
522c "Manual" Room State
522d "Lockout" Room State
525 "Save" Button
601a "Vacancy Off" Room State
601b "Vacancy Low" Room State
601c "Fast Vacancy Off" Room State
602 "Vacancy Scene"
603 "Vacancy Timeout"
901a "Occupancy Auto/Off" Room State
901b "Occupancy High/Low" Room State
902 "Occupancy Scene"
903 "Vacancy Scene"
904 "Vacancy Timeout"
1101 "Manual High" Room State
1102 "Initial Scene"
1201a "Lockout High" Room State
1201b "Lockout Low" Room State
1201c "Lockout Photocell" Room State
1202 "Initial Scene"
1500 Holidays Settings View
1501 Holidays Window
1502 Selectable Fields
1503 "Holiday" Column
1504 "Next Observed Date" Column
1505 "Day Pattern" Column
1507 Add Icon Button
1508 Delete Icon Button
1509 Edit Icon Button
1511 Day Type Drop-Down Menu
1512 "Add Holidays" Button
1513 "Add Holidays" Window
1514 "Save" Button
1515 Fillable Fields
1600 Day Patterns View
1601 "Day Patterns" Window
1603 List of Day Types
1605 Add Icon Button
1606 Delete Icon Button
1607 Edit Icon Button 1610 "Day Patterns" Scheduling Window
1611a "Normal Business Day" Day Type
1611b "Weekend/Holiday" Day Type
1611c "Half Day" Day Type
1611d "Late Hours" Day Type
1615 "Room Categories" Column
1616 Timeline
1619 "Apply Room State" Window
1620a-n Selectable Time Interval Blocks
1621 Selected Time Period
1800 Calendar View
1801 Calendar
1802 "Legend" Window
1803 "Apply Day Pattern" Window
1806a-n Selectable Day Blocks
1807 Default Setting
1809 Changed Default Icon
1810 Add Exception Icon
1900 "Add Exception" Window
1902 "Single Room" Drop Down Menu
1904 "Room Category" Drop Down Menu
1906 "Room State" Drop Down Menu
1908 Time Fields
1910 Date Fields
1912 Exception Day Type Selection
1914 "Save" Button
1916 Exception Icon
1918 "Cancel" Button
2000 Shades Day Patterns View
2001 "Apply Room State" Window
2002a "Lockout Open" Room State
2002b "Lockout Closed" Room State
2002c "Lockout Photocell" Room State
2002d "Manual Photocell" Room State
2004 Timeline
2100 Climate Day Patterns View
2101 "Apply Room State" Window
2102a "Setback" Room State
2102b "Normal/Setback" Room State
2102c "Normal" Room State
2102d "Normal/Standby" Room State List of Acronyms Used in the Specification in Alphabetical Order The following is a list of the acronyms used in the specification in alphabetical order.
ASIC Application Specific Integrated Circuits
AV Audiovisual
BAS Building Automation Systems
BMS Building Management Systems
CAN Campus Area Network
COM Communication Port
CPU Central Processing Unit
EDGE Enhanced Data Rates for GSM Evolution
EMS Energy Management Systems
HVAC Heating, Ventilation and Air Conditioning
I/O Input/Output
IP Internet Protocol
IR Infrared
IrDA Infrared Data Association
LAN Local Area Network
LED Light Emitting Diode
MAN Metropolitan Area Network
NIC Network Interface Card
PAN Personal Area Network
PoE Power over Ethernet
PSTN Public Switched Telephone Network
RAM Random Access Memory
RISC Reduced Instruction Set
ROM Read-Only Memory
URL Uniform Resource Locator
USB Universal Serial Bus
WAN Wide Area Network Mode(s) for Carrying Out the Invention For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of building automation and monitoring, building automation systems (BAS), building management systems (BMS), and energy management systems (EMS) (collectively referred herein as "building automation system"), but is not limited thereto, except as may be set forth expressly in the appended claims. The embodiments of the building automation system can be used in small, mid, or large scale residential or commercial installations. While the embodiments are described herein as being implemented for commercial building management, they are not limited to such an implementation. The present embodiments may be employed in other type of venues or facilities, including in residential, retail, or non-profit structures or venues. Additionally, while the building automation system described herein as managing and controlling an entire building, it may be scaled up to manage an entire campus of buildings or scaled down to manage a floor or a section of a floor, such as a department, within a building. The building automation system of the present embodiments can control and monitor numerous electronic devices, including one or more of heating, ventilation and air conditioning (HVAC), lighting, shading, security, appliances, door locks, and audiovisual (AV) equipment, among others.

The present embodiments provide building automation scheduling system and method for scheduling electronic devices of a building automation system. The building automation scheduling system of the present embodiments implements maintained operational states and limits the number of available states by type of day, type of room, and type of state to improve understanding and efficiency. The present embodiments provide users with intuitive and easily comprehensible programming tools to build scheduled events of a building automation system.

FIG. 1 illustrates a block diagram depicting a building automation system 100 for controlling and managing one or more buildings, such as building 102, according to an embodiment. It should be noted that the exemplary embodiment of system 100 illustrated in FIG. 1 may be varied in one or more aspects without departing from the spirit and scope of the teachings disclosed herein. Building automation system 100 may comprise one or more user communication devices 101a-n, server 110, a database 106, a communication network 108, and various devices installed in the building 102 such as control system processors 103 and electronic devices 105.

According to an embodiment, the present embodiments deliver building automation and management via cloud computing on server 110 without the responsibilities of managing proprietary equipment, servers, or software on the corporate network. The server 110 may comprise or be associated with a building automation application 112 configured for providing a web-based user interface on the user communication devices 101a-n with which the user can interact with the building automation system 100. By leveraging remote access to the control system processors 103 and/or the controllable electronic devices 105 via server 110, a user may monitor and control the devices 105 and/or environment settings in a building 102 using any user communication device 101a-n from anywhere in the world without any need for a local copy of any special software. The building automation application 112 provides a user interface on the user communication device 101a-n in communication with the server 110 allowing a user to setup scheduled events to control the various electronic devices 105 within the building 102. However, according to another embodiment, the building automation application 112 may alternatively reside on a control system processor 103.

User communication devices 101a-n may access the services provided by the server 110 using a web-browser, such as Internet Explorer, Microsoft Edge, Firefox, Google Chrome, Opera, Safari, or the like. While the embodiments are described herein as accessing server 110 via a web-browser, the present embodiments are not limited to such an implementation. According to other embodiments, the user communication devices 101a-n may comprise a proprietary native mobile app, or any other similar software application, configured to access server 110 via the communication network 108. User communication devices 101a-n may be any computers known in the art, including, but not limited to a desktop computer, a laptop, a portable electronic device, a mobile computer, a smartphone, a tablet, a personal digital assistant, or any other computer configured for communicating with a remove server, such as server 110, via a communication network through a web-browser or other similar application. Each user communication device 101a-n may comprise a central processing unit (CPU), a user interface (e.g., display, keyboard, mouse, or the like), one of numerous forms of storage (e.g., solid-state memory (RAM, ROM, and the like), magnetic memory, such as disc drives, tape storage, and the like, and/or optical memory, such as DVD), and a network interface, as is known in the art. Using the network interface, each user communication device 101a-n can communicate with server 110 via the communication network 108.

Communication network 108 can incorporate one or more of the Internet, a wide area network (WAN), a local area network (LAN), a personal area network (PAN), a wireless network, a campus area network (CAN), a metropolitan area network (MAN), or the like. Communication network 108 may include a public switched telephone network (PSTN), a cable telephony network, an Internet Protocol (IP) telephony network, a wireless network, a hybrid Cable/PSTN network, a hybrid IP/PSTN network, a hybrid wireless/PSTN network or any other suitable communication network or combination of communication networks. In addition, other network embodiments can be deployed with many variations in the number and type of devices, communication networks, communication protocols, system topologies, and myriad other details without departing from the spirit and scope of the present embodiments. Communication network 108 may include one or more gateway devices to provide with an entrance to communication network 108, which may include software and/or hardware components to manage traffic entering and exiting communication network 108 and conversion between the communication protocols used by various communication devices.

The building automation system 100 may further comprise one or more control system processors 103 or gateways in communication with the server 110 via the Ethernet switch 104 and communication network 108. Control system processors 103 may be connected to various electronic devices 105 throughout building 102 via a wireline or wireless local area network 129. The control system processors 103 may provide a web interface for the sever 110 to communicate to electronic devices 105 within various rooms of the building 102. The control system processor 103 is used for, among other things, controlling and monitoring various devices and environmental conditions throughout a structure. The control system processor 103 may be a 3-Series Control System® (CP3N) available from Crestron Electronics, Inc. of Rockleigh, N.J. The Crestron 3-Series Control system provides a complete integrated audiovisual (AV) or automation solution. The control system processors 103 may comprise similar components as server 110 as further described below. The control system processors 103 may further provide a time-clock function to the event scheduling system of the present embodiments.

The control system processors 103 may control one or more of the following electronic devices: lighting devices 121, including but not limited to lamps, ballasts, light emitting diode (LED) drivers; HVAC devices 124 including but not limited to thermostats, air conditioning units, heating units, filtration systems, fans, humidifiers; shading devices 126 including but not limited to motorized window treatments, dimmable windows; sensors 127, including but not limited to occupancy sensors, proximity sensors, sound sensors, microphones, temperature sensors; AV devices 122, including but not limited to content sources, content sinks, video recorders, cameras, VCR, DVD/DVR, CD player, audio receivers, audio system devices, speakers, telephones, video phones, projectors, projector screens, touch panels, cable television box, television such as plasma, liquid crystal display, light-emitting diode flat panel, and cathode ray tube television; security devices 128 including but not limited to security cameras, monitors and door locks; appliances 123 including but not limited to refrigerators, ovens, blenders, microwaves; control devices 125 including but not limited to switches, relays, current limiting devices; industrial devices including but not limited to motors, pumps, chillers, and air compressors. Other types of electronic devices 105 are contemplated depending on building implementation. As indicated above, according to an embodiment, one of the control system processors 103 may comprise the building automation application 112.

One or more network interfaces may provide connectivity between the control system processors 103 and electronic devices 105, and among the electronic devices 105 via the local area network 129. The network interface may represent, for example, one or more network interface cards (NIC) or a network controller. In certain embodiments, the network interface may include a PAN interface. The PAN interface may provide capabilities to network with, for example, a Bluetooth® network, an IEEE 802.15.4 (e.g. Zigbee network), or an ultra-wideband network. As should be appreciated, the networks accessed by the PAN interface may, but do not necessarily, represent low power, low bandwidth, or close range wireless connections. The PAN interface may permit one electronic device 103/105 to connect to another local electronic device 103/105 via an ad-hoc or peer-to-peer connection. The control system processors 103 may directly communicate to the electronic devices 105 via the local area network 129, or may communicate through one or more network bridges.

The network interface may also include a LAN interface. The LAN interface may represent an interface to a wired Ethernet-based network but may also represent an interface to a wireless LAN, such as an 802.11x wireless network. Additionally, in many cases, a connection between two electronic devices 103/105 via the LAN interface may involve communication through a network router or other intermediary device. Ethernet connectivity enables integration with IP-controllable devices and allows the processors to be part of a larger managed control network. Whether residing on a sensitive corporate LAN, a home network, or accessing the Internet through a cable modem, the control processors 103 may provide secure, reliable interconnectivity with IP-enabled devices, such as touch screens, computers, mobile devices, video displays, Blu-ray Disc® players, media servers, security systems, lighting, HVAC, and other equipment—both locally and globally. For some embodiments, the network interfaces may include the capability to connect directly to a WAN via a WAN interface. The WAN interface may permit connection to a cellular data network, such as the EDGE network or other 3G network.

The control system processors 103 and electronic devices 105 may also include one or more wired input/output (I/O) interface for a wired connection between one electronic device and another electronic device. One or more wired interfaces may represent a serial port, for example a communication (COM) port or a universal serial bus (USB) port. Additionally, the wired I/O interface may represent, for example, a Cresnet® port. Cresnet® connectivity provides a network wiring solution for Crestron keypads, lighting controls, thermostats, and other devices that don't require the higher speed of Ethernet. The Cresnet® bus offers wiring and configuration, carrying bidirectional communication and 24 VDC power to each device over a simple 4-conductor cable.

One or more infrared (IR) interfaces may enable the control system processors 103 and electronic devices 105 to receive and/or transmit signals with infrared light. The IR interface may comply with the Infrared Data Association (IrDA) specification for data transmission. Alternatively, the IR interface may function exclusively to receive control signals or to output control signals. The IR interface may provide a direct connection with one or more devices such as a centralized AV sources, video displays, and other devices. One or more programmable relay ports may enable the control system processors 103 and/or electronic devices 105, such as control devices 125, to control window shades, projection screens, lifts, power controllers, and other contact-closure actuated equipment. One or more "Versiport" I/O ports may enable the integration of occupancy sensors, power sensors, door switches, or anything device that provides a dry contact closure, low-voltage logic, or 0-10 Volt DC signal.

According to an alternative embodiment, building automation system 100 may operate without the utilization of control system processors 103. The various electronic devices 105 dispersed throughout the building 102 may operate as a network of devices in communication with the server 110 over communication network 108. According to some aspects of the embodiments, each controllable electronic device 105 may comprise a Power over Ethernet (PoE) interface for receiving electric power as well as for sending and receiving signals over an Internet Protocol (IP) based network.

Server 110 may be used to aggregate multiple control system processors 103 into a centralized management and control platform. The server 110 may provide similar functions as the control system processors 103 for remote control and also comprise additional services. Server 110 may be a dedicated, private server, employing standard security protocols. Server 110 may be always active and accessible to any user communication device 101a-n from any location via a unique Uniform Resource Locator (URL) and host name. Server 110 may be incorporated into a conventional standalone server, although in other embodiments, the function of server 110 may be distributed across multiple computing systems and architectures. Multiple, redundant servers may be provided for additional backup and security. For example, server 110 may include separate web, app, or email servers.

Server 110 may comprise one or more network interfaces 118 to provide connectivity with, among other things, user communication devices 101a-n, one or more databases, such as database 106, control system processors 103 and/or electronic devices 105. The network interface 118 may represent, for example, one or more network interface cards (NIC) or a network controller. According to an embodiment, the network interface 118 includes the capability to connect directly to a wide area network (WAN). The network interface 118 may permit a connection to a cellular data network, such as the Enhanced Data rates for GSM Evolution (EDGE) network or other 3G network.

Server 110 may include a central processing unit (CPU) 111 configured for providing processing capability to execute an operating system, run various applications, and/or provide processing for one or more of the techniques described herein. For example, the CPU 111 may represent one or more microprocessors, and the microprocessors may be "general purpose" microprocessors, a combination of general and special purpose microprocessors, or application specific integrated circuits (ASICs). Additionally or alternatively, the CPU 111 may include one or more reduced instruction set (RISC) processors, video processors, or related chip sets.

Server 110 may further include any one of numerous forms of storage, including main memory 113 and nonvolatile storage 114. Main memory 113 may be communicably coupled to the CPU 111 and may store data and executable code. The main memory 113 may represent volatile memory such as random access memory (RAM), but may also include nonvolatile memory, such as read-only memory (ROM) or Flash memory. In buffering or caching data related to operations of the CPU 111, the main memory 113 may store data associated with various engines and modules running on the server 110. The nonvolatile storage 114 may represent any suitable nonvolatile storage medium, such as a hard disk drive or nonvolatile memory, such as Flash memory. Being well-suited to long-term storage, the nonvolatile storage 114 may store data files such as media (e.g., music and video files), software (e.g., for implementing functions on the server 110), and building model data files, among other types of data.

Nonvolatile storage 114 may further include a building automation application 112 operable to enable the control and monitoring of electronic devices 105 of the building automation system, as well as perform other operations discussed below. Building automation application 112 may comprise a plurality of software engines 115. Software engines 115 process information received from user communication devices 101a-n, database 106, control system processors 103, and/or electronic devices 105. Depending upon implementation, various aspects of teachings of the present embodiments may be implemented in a single building automation application, a plurality of applications, a single software engine, in a plurality of software engines, in one or more hardwired components or in a combination of hardwired and software systems. In addition to one or more software engines 115, nonvolatile storage 114 also includes one or more data storage areas 116. A data storage area 116 is operably associated with the main memory 113 and CPU 111. Data storage area 116 of non-volatile storage may be leveraged to maintain data pertinent to the building automation application 112 for providing control and monitoring of electronic devices 105 of the building automation system. Data storage areas 116, or portions thereof, may also be utilized to store myriad other data.

The building automation application 112 may be run on the server 110 and may comprise a web application—a client-server software application which runs in a web-browser of a client computer, such as one or more user communication devices 101a-n. In another embodiment, building automation application 112 may comprise a proprietary native mobile app in communication with building management server 110. In yet another embodiment, the building automation application 112 may be run on one of the control system processors 103. The number and types of applications, software engines, and data storage areas may be varied and, as such, the specific arrangement discussed herein is presented primarily for descriptive purposes.

Software engines 115 of the building automation application 112 may comprise an event scheduling engine 132. The event scheduling engine 132 may be configured for allowing a user to preprogram setting presents, scenes, building rules, and schedule of event of electronic devices 105 of the building automation system, as will be further described below.

According to the aspects of the present embodiments, control system processors 103 and/or electronic devices 105 communicate with the server 110 to receive various control commands. To that end, software engines 115 of server 110 may comprise a control engine 131 configured to send at least one command to control the electronic devices 105. Control commands may comprise on-demand commands generated from user communication devices 101a-n. For example, the at least one command may include a command to power on/off or dim a lighting device, control a touch panel, raise/lower the shades, power on/off or adjust the temperature of an HVAC system, enable/disable a security system, power on/off a sensor, power on/off a local computer, or the like. Depending upon implementation, other control commands are contemplated by the present embodiments. In other embodiments, control engine 131 is configured for transmitting preprogrammed control commands generated by the event scheduling engine 132. For example, a scheduled event may generate control commands to turn lights off in the building 102 during the end of business hours.

Additionally, control system processors 103 may transmit status information of the various electronic devices 105 of building 102. Server 110 can comprise a building monitoring engine 134 configured for monitoring the operation of the building 102 and providing this information on a user communication device 101a-n. Building monitoring engine 134 may be employed to provide real-time or live status information of resources of the building, such as environmental resources and conference room devices. As such, status information may be transmitted to the building monitoring engine 134 on-demand.

Additionally, status information may be collected and stored on the database 106. The database 106 can be co-located with the server 110, or it can be located remotely in various different systems and locations. Database 106 may include any one of numerous forms of storage devices and storage media, such as solid-state memory (RAM, ROM, and the like), magnetic memory, such as disc drives, tape storage, and the like, and/or optical memory, such as DVD. Building monitoring engine 134 of server 110 may be configured to recall historic status information stored in the database 106.

In addition, software engines 115 may comprise an account engine 136. Server 110 may be utilized to provide building automation and management services to a plurality of buildings. One or more buildings, such as building 102, may be associated with an account. Account engine 136 may be configured to create such accounts and correlate data relevant to a particular building, such as building 102, in these accounts, including system status information of a building 102, as well as other data related to building 102. Account engine 136 may request a variety of data from a user during a registration process. For example, requests for data may include the building's address, list of users who are permitted to access the building management system of building 102, as well as their names and passwords for registration purposes. Account engine 136 may be further configured for providing user authentication to allow access to a particular account and building management services. The account engine 136 may check the access of a user to building management services of a particular building by maintaining a database listing access permissions for resources and users as identified by user IDs and passwords.

The software engines 115 of the building automation application 112 may also include a user interface engine 133. The user interface engine 133 may be leveraged in association with one or more included software engines and data available in data storage areas to enable visual layout and presentation structure of the building management services provided by server 110. User interface engine 133 may be configured to present the visual layout on user communication devices 101a-n via one or more webpages. FIGS. 4-21, discussed below, include embodiments of various webpages whose presentation and layout may be provided by the user interface engine 133.

FIG. 2 illustrates a schematic diagram of a plurality of software modules of the event scheduling engine 132 of the building automation application 112 in accordance with an illustrative embodiment. The event scheduling engine 132 of the building automation application 112 may comprise a "Room Categories" module 202, a "Room States" module 204, a "Day Types" module 206, a "Day Patterns" module 208, and a "Calendar" module 210. Building automation application 112 may be run on the server 110 and/or in a web-browser of one or more user communication devices 101a-n as a client-server software application.

In another embodiment, the control system processor 103 may comprise similar configuration as server 110 and the building automation application 112 may be run on a control system processor 103 and may be accessed via a web interface. The functionality of the building automation application 112 may be exposed via a webpage from the device itself. The users of the system will log into the webpage via a URL and be exposed to all functionality allowed by the control system processor 103.

The "Room Categories" module 202 may be configured for classifying rooms of a building by room categories. Building 102 may comprise many rooms or spaces. System 100 may comprise room or space nodes each identifying a space or a room located within building 102. The room nodes may be stored on database 106 and accessed by the server 110. Although the present description hereafter describes the room nodes as being recalled from database 106 by server 110, the present embodiments are not limited thereto. In another embodiment, the room nodes may be stored on a memory of a control system processor 103.

These room nodes may be organized in the memory in a tree topology, with the building as the root, floors as children, and individual spaces as sub-children. Each room node may be associated with one or more electronic devices 105 installed within the building 102. This can be accomplished by first performing a discovery process by discovering all the electronic devices 105 connected to the local area network 129 within the building 102. The server 110 may communicate to the control system processors 103 to discover electronic devices 105 connected to the local area network 129. In another embodiment, server 110 can communicate directly with electronic devices 105 via networks 108 and 129 if, for example, these devices are in direct communication with the server 110 without the use of control system processors 103. The discovery process may provide a list of electronic devices 105. Each electronic device 105 may be identified by a unique ID, such as the device's serial number, as well as a model number, device name, device type, or the like. Each such electronic device 105 is associated with a room node. For example, all electronic devices 105 located within a conference room may be associated with a conference room node. This association allows for monitoring and controlling the building 102 space by space. This association may be stored in database 106.

Using the building automation application 112, system user can classify these room nodes of building 102 by room type or "Room Categories," i.e., what the room or space is being used for. This categorization allows all rooms or spaces falling under a specific category to operate in the same way without the need to create separate events for each room. For example, a single scheduling event may be created to turn the lights off in all rooms falling under a "conference room" category at the end of a business day. Room categories may include lobby, hallways, staircases, common areas, conference rooms, private offices, open offices, bathrooms, etc., in a commercial building 102, or kitchen, living room, bedrooms, bathrooms, etc., in a residential building. The "Room Categories" may comprise default room categories stored in a memory, or can comprise "Room Categories" generated or edited by a user. Room classification by room categories may be changed by the user at any time when the utilization of the space changes.

The "Room States" module 204 is configured for defining various predefined classes of room behaviors. A room behavior may apply to all the electronic devices 105 in the room, or to a class of electronic devices 105, e.g., lighting, shades, security, HVAC, AN, or the like. Defining predefined "Room States" for a group of electronic devices 105 eliminates the requirement of programming each room device separately. According to an embodiment, "Room states" for lighting control may comprise "vacancy", "occupancy", "manual", and "lockout" states, as discussed below. For example, the "occupancy" room state may comprise an occupancy driven lighting control that defines a behavior where lights turn on automatically when an occupancy sensor detects occupancy room and turn off automatically when the occupancy sensor detects vacancy. This single room state controls both light fixtures in a room and at the same time enables the operation of occupancy/vacancy sensors. As such, only a single scheduled event needs to be created by a user. According to an embodiment, the "Room States" are predefined by the building management application 112. However, each room state may have settings associated with it that can be used for modification, as further discussed below. Other states than the ones discussed herein are contemplated by the present embodiments.

The "Day Types" module 206 classifies various days by type, such as "Weekday" or "Normal Business Day", "Weekend/Holiday", "Half Day", "Late Start," "Late Hours", or the like. The "Day Types" may comprise default day types, or can comprise "Day Types" generated or edited by a user.

The "Day Patterns" module 208 is configured for defining a "Day Pattern" for each "Day Type" by assigning specific "Room States" to each "Room Category" over a course of the day. As discussed below, a "Day Pattern" may comprise a horizontal timeline of 24 hours divided by time intervals or blocks, such as 15 minute blocks. Each time block can be assigned a "Room State". Accordingly, "Room States" can be assigned to a "Room Category" for the entire 24 hour period of a day of a particular "Day Type". Other "Day Types" may be populated in a similar fashion. For example, for a "Normal Business Day" an "Occupancy" room state may be assigned to "Hallways" from 12:00 AM to 6:00 AM.

The "Calendar" module 210 may be configured for assigning "Day Types", each defining "Day Patterns", to any given calendar day.

FIG. 3 illustrates a flowchart 300 showing the process for scheduling electronic devices of a building automation system according to the present embodiments. Process 300 can be performed by one or more of the various software engines 115 of the building automation application 112, including the event scheduling engine 132.

In step 302, the building automation application 112 may be configured for classifying rooms of a building by "Room Categories", such as lobby, hallways, staircases, common areas, conference rooms, private offices, open offices, or bathrooms in building 102.

In step 304, the building automation application 112 is configured for defining "Room States" that specify a behavior of electronic devices in a room, such as "vacancy", "occupancy", "manual", and "lockout" states.

In step 306, the building automation application 112 is configured for defining "Day Types" to classify days by types, such as "Weekday" or "Normal Business Day", "Weekend/Holiday", "Half Day", "Late Start," "Late Hours", or the like.

Next, in step 308, for each "Day Type", the building automation application 112 is configured for defining a "Day Pattern" by assigning specific "Room States" to each "Room Category" over a course of the day.

Finally, in step 310, the building automation application 112 may be configured for assigning "Day Types" to calendar days on a "Calendar".

The above disclosed method is not meant to limit the aspects of the embodiments, or to suggest that the aspects of the embodiments should be implemented following the aforementioned method. The purpose of the aforementioned method is to facilitate the understanding of one or more aspects of the embodiments and to provide the reader with one of many possible implementations of the processed discussed herein. It should be understood by one of ordinary skill in the art that the steps of the aforementioned method may be performed in a different order and that some steps may be eliminated or substituted. For example, steps 302, 304, and 306 may occur in any order.

FIG. 4 illustrates a schematic diagram depicting a "Building Automation Scheduler" page 400 of the building automation application 112, according to an embodiment. The "Building Automation Scheduler" page 400 may be accessed using a URL. The "Building Automation Scheduler" page 400 may comprise a "Calendar" tab 402, a "Day Patterns" tab 404, and a "Settings" tab 406. The "Settings" tab 406 comprises sub tabs to configure the "Room Categories" 411, "Room States" 412, and "Holidays" 414.

Selecting the "Settings" tab 406 and the "Room Categories" tab 411 displays the room categories settings view 410 shown in FIG. 4. The room categories setting view 410 comprises a room category table 415. Table 415 comprises a "Room" column 416a listing rooms or room nodes identifying the various rooms or spaces within building 102. Table 415 also comprises a "Category" column 416b listing categories classifying each respective room according to "Room Categories". During initial setup, the "Room" column 416a of table 415 may be populated by recalling the room nodes from the database 106. As discussed above, each room node is associated with one or more electronic devices 105 installed in a respective room in the building 102. The "Category" column 416b may be empty. To classify a room under a "Room Category", a user may select a room in the "Room" column 416a by clicking on a room, for example "Room 107", and then clicking on the "Assign Category" button 417. The "Assign Category" button 417 is configured to open an "Assign Category" window 418. The "Assign Category" window 418 may comprise a list of possible "Room Categories" with selectable fields the user can click on to choose a room category. This list of "Room Categories" may comprise a pre-populated default list of "Room Categories" provided by the building automation application 112. For example, the default "Room Categories" list may comprise lobbies, hallways/stairs, conference rooms, private offices, open offices, bathrooms, exterior, and parking. Other default list may be used depending on implementation and the type of building. The user may click on the selectable field associated with the "Conference Rooms" category to classify "Room 107" as a conference room. The user may click on the "Save" button 419 to save the changes. The association between the room or room node and the room category may be stored on database 106.

The room categories settings view 410 may further comprise an "Edit Room Categories" button 420. The "Edit Room Categories" button 420 is configured for opening an "Edit Room Categories" window 421 comprising a list of possible room categories. A user can add a room category by pressing the add icon button 423 configured for displaying a text field 426 into which the user can enter text. A user can delete a room category from the list by selecting a room category and pressing the delete icon button 424. A user can edit a name of a room category in the list by selecting a room category and pressing the edit icon button 425. Any type and number of room categories may be added. According to an embodiment, the pre-populated default list of "Room Categories" may not be deleted or edited. After adding additional room categories, the user may return to the room category table 415 to finish classifying the rooms listed in the "Room" column 416a by room category.

According to another embodiment, each space node stored on database 106 may comprise information identifying what the associated space is being used for. For example, the space node information may comprise the space name or some other descriptive information. The building scheduling application 112 may automatically scan through this information, analyze the data, and automatically classify the space nodes by categories. The building scheduling application 112 may prepopulate the "Category" column 416b of the Room Category Table 415 with the determined room category classification. The user may review the list to verify whether the classification is correct and edit any incorrect room category classifications.

According to the present embodiments, all the rooms classified under a single "Room Category" operate in the same way such that no individual events need to get created for each room in building 102. For example, the lighting of "Hallway/Stairs" category may be programmed to be turned on at 6:00 AM and turn off at 9:00 PM. Accordingly, all the rooms or spaces falling under the "Hallway/Stairs" category will operate in the same way.

Next, the user may click on the "Room States" tab 412 to configure the various room states. Pressing the "Room States" tab 412 is configured to open the room states settings view 500 shown in FIG. 5. The room states settings view 500 may comprise a "Room States" window 501 with a list of room states. Initially, the "Room States" window 501 may be empty. According to another embodiment, the "Room States" window 501 may be initially prepopulated with default room states. Each room state describes a behavior of a room and specifically may comprise control commands to control one or more electronic devices 105 installed in the room. The room states settings view 500 may further comprise a various tabs defining the classes or type of electronic devices the user wishes to control, such as a "Lighting" tab 511, a "Shades" tab 512, and a "Climate" tab 513. Fewer, other, or additional tabs may be present to control various types of electronic devices, such as an "AN" tab, "Appliances" tab, "Security" tab, or the like. For each class of electronic devices, the types of room states would change as appropriate to control respective types of electronic devices. To illustrate the even scheduling system and method of the present embodiments, the description below describes a method of configuring lighting by selecting the "Lighting" tab 511.

To add a room state, the user may press the add icon button 515 configured for opening a room state configuration window 520. The room state configuration window 520 may comprise a room states drop-down menu 521 from which a user may select a room state. For example, the room states for lighting may comprise a "Vacancy" room state 522a, an "Occupancy" room state 522b, a "Manual" room state 522c, and a "Lockout" room state 522d. Fewer, other, or additional lighting room states may also be provided. While these room sates are predefined by the building automation application 112, each room state may have settings associate with it that can be used by the user for modification of the room state as discussed below. When the user finishes selecting desired modifications, the user may press the "Save" button 525 to save the changes. The new room state is then added to the "Room States" window 501.

To delete a room state, the user may select a room state from the list of room states in the "Room States" window 501 and then press the delete icon button 516. To edit a room state, the user may select a room state from the list of room states in the "Room States" window 501 and then press the edit icon button 517. The edit icon button 517 is configured for opening the room state configuration window 520 for the selected room state so that the user may modify the room state settings. Then user may then press the "Save" button 525 to save the changes.

FIG. 6 illustrates a schematic diagram of the room states settings view 500 showing the modification options for the "Vacancy" room state 522*a*. After a user presses the add icon button 515 and selects a room state from the room states drop-down menu 521, the room state configuration window 520 is configured to display the possible modification options for the selected room state. For example, selection of the "Vacancy" room state 522*a* is configured for displaying a "Vacancy Scene" modification option 602 and a "Vacancy Timeout" modification option 603.

A room that is in a "Vacancy" mode will have its occupancy sensor enabled and operating in a vacancy mode. During the "Vacancy" mode, lights are set to the selected "Vacancy Scene" 602 and must be turned on manually by someone walking into the room. After the lights have been turned on manually, the occupancy sensor is configured to detect vacancy—i.e., when the room has been vacated. Once the occupancy sensor determines that the room is vacant for a certain period of time, as defined by a selected "Vacancy Timeout" 603, the lights are automatically set back to the selected "Vacancy Scene" 602. The user may select and specify the desired "Vacancy Scene" 602 and the "Vacancy Timeout" 603 using drop-down menus. The "Vacancy Scene" 602 drop-down menu may comprise "Off" and "Low" options. The "Vacancy Timeout" 603 drop-down menu may comprise 30 seconds and 15 minutes. Other scenes or time values may be used.

For example, the user may add a "Vacancy Off" room state 601*a* by choosing a "Vacancy" room state 522*a*, "Off" vacancy scene 602, "15 m" vacancy timeout, and pressing the "Save" button 525. The room state nomenclature, such as "Vacancy Off", may be predefined by the building automation application 112 based on a combination of chosen modifications. Of course, other room nomenclature may be used to define similar room functions. A room that is in a "Vacancy Off" state will have the lights initially turned off, which must be turned on manually by a room occupant. After the lights have been turned on, the occupancy sensor is configured to detect whether the room has been vacated. The lights will be turned off automatically after the room has been vacated for a period of 15 minutes.

A user may also add a "Vacancy Low" room state 601*b*, as shown in FIG. 7, by choosing a "Vacancy" room state 522*a*, "Low" vacancy scene 602, "15 m" vacancy timeout 603, and pressing the "Save" button 525. A room that is in a "Vacancy Low" state will have the lights initially set to the selected low vacancy scene, where the lights are set to a low scene (i.e., low or dimmed brightness, but not fully turned off)). When the lights are manually turned up to a brighter scene, the occupancy sensor is triggered to sense vacancy. After the room is vacated for a period of 15 minutes, the lights will be set back to the low scene. For example, in a hallway during night hours, after an occupant has turned the lights up to full brightness, the lights may go to a low setting (night scene) instead of turning off completely when the occupant leaves the hallway.

Additionally, a user may add a "Fast Vacancy Off" room state 601*c*, as shown in FIG. 8, by choosing a "Vacancy" room state 522*a*, "Off" vacancy scene 602, "30 s" vacancy timeout 603, and pressing the "Save" button 525. A room that is in a "Fast Vacancy Off" state will have the lights initially turned off. When the lights have been manually turned on by a room occupant, the lights will be turned off after the room is vacated for a period of just 30 seconds. "Fast Vacancy Low" room state will operate in a similar fashion, except the lights will be set to a low setting when the room is vacant.

FIG. 9 illustrates a schematic diagram of the room states settings view 500 showing the modification options for the "Occupancy" room state 522*b*. Selection of the "Occupancy" room state 522*b* causes the room state configuration window 520 to display an "Occupancy Scene" modification option 902, a "Vacancy Scene" modification option 903, and a "Vacancy Timeout" modification option 904.

A room that is in an "Occupancy" mode will have its occupancy sensor enabled and operate in an occupancy mode. During the "Occupancy" mode, the lights are initially set to the chosen "Vacancy Scene" 903. Thereafter, the lights automatically go to the chosen "Occupancy Scene" 902 when the occupancy sensor detects occupancy, and lights automatically return to the chosen "Vacancy Scene" 903 when the occupancy sensor detects that the room has been vacant for a certain period of time, as defined by a selected "Vacancy Timeout" 904. The user may select and specify the desired "Occupancy Scene" 902, "Vacancy Scene" 903, and the "Vacancy Timeout" 904 using drop-down menus. The "Occupancy Scene" 902 drop-down menu may comprise "Auto" and "High" options. The "Vacancy Scene" 903 drop-down menu may comprise "Off" and "Low" options. The "Vacancy Timeout" 904 drop-down menu may comprise 30 seconds and 15 minutes. Other scenes or time values may be used.

For example, the user may add an "Occupancy Auto/Off" room state 901*a* by choosing an "Occupancy" room state 522*b*, "Auto" occupancy scene 902, "Off" vacancy scene 903, "15 m" vacancy timeout, and pressing the "Save" button 525. A room that is in an "Occupancy Auto/Off" state will have the lights initially turned off. When the occupancy sensor detects that the room is occupied, the lights will set to a scene last recorded by a keypad installed in the room. When the room is then vacated for a period of 15 minutes, the lights will be turned off.

A user may also add an "Occupancy High/Low" room state 901*b*, as shown in FIG. 10, by choosing an "Occupancy" room state 522*b*, "High" occupancy scene 902, "Low" vacancy scene 903, "15 m" vacancy timeout 904, and pressing the "Save" button 525. A room that is in an "Occupancy High/Low" state 901*b* will have the lights initially at a low scene (i.e., dimmed or dark, but not fully turned off). When the occupancy sensor detects that the room is occupied, the lights will set to a high scene (i.e., lights are set to high or full brightness). When the room is then vacated for a period of 15 minutes, the lights will be set back to the low scene.

A user may add similar occupancy room states by choosing other combinations of modifications, such as an "Occupancy Auto/Low" room state, "Occupancy High/Off" room state, "Fast Occupancy Auto/Off" room state, "Fast Occupancy Auto/Low" room state, "Fast Occupancy High/Off" room state, and "Fast Occupancy High/Low" room state.

FIG. 11 illustrates a schematic diagram of the room states settings view 500 showing the modification options for the "Manual" room state 522*c*. Selection of the "Manual" room state 522*c* causes the room state configuration window 520 to display an "Initial Scene" modification option 1102.

A room that is in a "Manual" mode will have occupancy sensor control (if any) disabled. During the "Manual" mode, the lights may be initially turned off. The lights go to the chosen "Initial Scene" 1102 when the lights are manually turned on by a room occupant. Thereafter, the lights can be manually controlled by a room occupant by pressing on a desired scene button on the keypad installed in the room. The system user may select and specify the desired "Initial Scene" 1102 using a drop-down menu. The "Initial Scene" 1102 drop-down menu may comprise "Auto", "High", and "Low" options. Other scenes may be used.

For example, the user may add a "Manual High" room state 1101 by choosing a "Manual" room state 522c and "High" initial scene 1102, and pressing the "Save" button 525. A room that is in a "Manual High" state 1101 will have the lights initially turned off. When a room occupant manually turns on the lights using a keypad installed in the room, the lights would be set to a "High" scene (i.e., set to a high or full brightness). The room occupant can then change the lighting scene at the keypad. A system user may add similar manual states by choosing other combinations of modifications, such as a "Manual/Auto" state and "Manual/Low" state.

FIG. 12 illustrates a schematic diagram of the room states settings view 500 showing the modification options for the "Lockout" room state 522d. Selection of the "Lockout" room state 522d causes the room state configuration window 520 to display an "Initial Scene" modification option 1202. A room that is in a "Lockout" mode will have occupancy sensor control (if any) disabled. Additionally, all the manual controls in the room or space for controlling lighting, such as keypads, will be disabled. During the "Lockout" mode, the lights are set to the chosen "Initial Scene" 1202 and will remain at that scene even when the keypad in the room is pressed. The user may select and specify the desired "Initial Scene" 1202 using a drop-down menu. The "Initial Scene" 1202 drop-down menu may comprise "High", "Low", and "Photocell". Other scenes may be used.

For example, the user may add a "Lockout High" room state 1201a by choosing a "Lockout" room state 522d and a "High" initial scene 1202, and pressing the "Save" button 525. A room that is in a "Lockout High" state will have the lights set and maintained at a high scene setting (i.e., set to a high or full brightness).

A user may also add a "Lockout Low" room state 1201b, as shown in FIG. 13, by choosing a "Lockout" room state 522d and a "Low" initial scene 1202, and pressing the "Save" button 525. A room that is in a "Lockout Low" state will have the lights set and maintained at a low scene setting (i.e., set to a dimmed brightness).

Further, a user may also add a "Lockout Photocell" room state 1201c, as shown in FIG. 14, by choosing a "Lockout" room state 522d and a "Photocell" initial scene 1203, and pressing the "Save" button 525. A room that is in a "Lockout Photocell" state will have the lights exclusively controlled by a photocell. The system of the present embodiments may utilize light harvesting such that the lights are turned off or dimmed according to detected ambient light level. During the "Lockout Photocell" state 1201c all manual control and occupancy sensor controls will be disabled.

After finishing room state configuration, the "Room States" window 501 will contain a list of possible room states a user can choose to apply to each room category as discussed below. The user can delete any of the states thereafter by pressing the delete icon button 516, add additional room states by pressing the add icon button 515, or modify the settings of any of the room states by pressing the edit icon button 517.

FIG. 15 illustrates a schematic diagram depicting a holidays settings view 1500 of the "Building Automation Scheduler" page 400 of the building automation application 112 according to an embodiment. The holidays settings view 1500 may be displayed by pressing the "Holidays" tab 414 under the "Settings" tag 406. The holidays settings view 1500 is configured for defining holiday day types. The holidays settings view 1500 may comprise a holidays window 1501 comprising a "Holiday" column 1503, a "Next Observed Date" column 1504, and a "Day Pattern" column 1505. The "Holiday" column 1503 may comprise a list of holidays. The "Next Observed Date" column 1504 may comprise the exact date of an upcoming holiday. The "Day Pattern" column 1505 may comprise the day type associated with the holiday.

The "Holiday" column 1503 may initially comprise a default list of holidays preprogrammed into the system. According to an embodiment, the default list of holidays may comprise United States public holidays. The list of holidays may comprise selectable fields 1502 allowing a user to select which holidays from the list of holidays 1501 should be observed. According to an embodiment, all federally observed United States public holidays are selected by default. A building manager of building 102 may modify the selection of holidays to correspond to holidays observed by an entity using the office space of building 102.

For each holiday in the "Holiday" column 1503 a user may edit the next observed date 1504. Specifically, the user may select the date the user wishes to edit and press the edit icon button 1509. For example, a user may wish to change the observed date for New Year's Day from "Sunday Jan 1 2017" to "Monday Jan 2 2017" to correspond to corporate holiday policy.

Additionally, for each holiday in the "Holiday" column 1503 the user may edit the day type or day pattern 1505. Specifically, the user may select the day pattern the user may wish to edit and press the edit icon button 1509, which will display a day type drop-down menu 1511. The day type drop-down menu 1511 may comprise the following day types: "Normal Business Day", "Weekend/Holiday", "Half Day", or "Late Hours". These day types may be edited by the user as described below. For example, the user may wish to change the day type for "Christmas Eve" from "Weekend/Holiday" to "Half Day".

The user may also manually add a holiday to the "Holiday" column 1503 by pressing the add icon button 1507, which in response displays fillable fields 1515. In the fillable fields 1515 the user may enter a holiday name, select a next observed date 1504, and select a desired day type 1505. The manually added holidays may be deleted by selecting the holiday to delete from the "Holiday" column 1503 and pressing the delete icon button 1508.

Furthermore, a user may add holidays of a different location or country or add religious holidays by pressing the "Add Holidays" button 1512. The "Add Holidays" button 1512 is configured to open the "Add Holidays" window 1513. The "Add Holidays" window 1513 may comprise a list of selectable fields next to prepopulated locations or countries and religious holidays which the user may select by checking or unchecking the selectable fields. To save changes the user may press the "Save" button 1514. Any newly checked selectable field will cause corresponding holidays to be added to the list of holidays in the "Holiday" column 1503 in window 1501. Any newly unchecked selectable field will cause corresponding holidays to be removed from the list of holidays in the "Holiday" column 1503 in window 1501. For example, if the user checks "Jewish Religious Holidays" in "Add Holidays" window 1513, corresponding holidays will be added to the "Holiday" column 1503, which the user may assign to day types.

FIG. 16 illustrates a schematic diagram depicting a day pattern view 1600 of the "Building Automation Scheduler" page 400 of the building automation application 112 according to an embodiment. The day pattern view 1600 may be accessed by selecting the "Day Patterns" tab 404. Using the day patterns view 1600, a user may define different types of days and corresponding day patterns. The day pattern view 1600 shown in FIG. 16 is configured for scheduling day patterns for operation of lighting 511 in building 102. Day patterns for other types of devices may be configured in a similar fashion as further described below. The day patterns view 1600 may comprise a "Day Patterns" window 1601 listing various day types 1603. Day types 1603 may initially comprise a default list of day types 1603, such as "Normal Business Day", "Weekend/Holiday", and "Half Day". A user may add additional day types, such as "Late Hours", by pressing the add icon button 1605. A user may delete day types by pressing the delete icon button 1606. A user may edit a name of a day type by pressing the edit icon button 1607. According to an embodiment, the default day types cannot be deleted or edited. Only manually added day types can be deleted and edited. The default list of day types 1603 may comprise a list relevant to the entity using the building automation system of the present embodiments. For example, a school may comprise a "summer hours" day type.

The day patterns view 1600 may further comprise a "Day Patterns" scheduling window 1610. The "Day Patterns" scheduling window 1610 is configured for defining day patterns for each day type by assigning specific room states to each room category throughout the course of the day. In other words, the "Day Patterns" scheduling window 1610 allows for defining how certain types of rooms will behave on certain types of days throughout the entire day. To define behavior for a normal business day, the user may select the "Normal Business Day" day type 1611a from the "Day Patterns" window 1601. In response, the "Day Patterns" scheduling window 1610 will display a schedule for a normal business day. The "Day Patterns" scheduling window 1610 may comprise a "Room Categories" column 1615 listing various room categories as defined via the room categories settings view 410 in FIG. 4. For example, the room categories may comprise "Lobbies", "Hallways/Stairs", "Conference Rooms", "Private Offices", "Open Offices", "Bathrooms", "Exterior", and "Parking".

For each room category, the "Day Patterns" scheduling window 1610 may comprise a horizontal timeline 1616 spanning twenty four hours, for example from 12:00 AM to 11:59 PM. The horizontal timeline 1616 for each room category may comprise a plurality of horizontally arranged selectable time interval blocks 1620a-n. Each block 1620a-n may span a time interval of 15 minutes. Other time intervals may also be used, such as 10 minutes, 30 minutes, 1 hour, or the like. One or more of these selectable time interval blocks 1620a-n that are adjacently arranged may be selected or highlighted by the user to span a selected time period. For example, in the timeline 1616 corresponding to the "Parking" room category the user may select a plurality of time interval blocks spanning a time period 1621 from 6:00 AM to 5:00 PM.

Under each category, the user may select a time period (e.g., time period 1621) and assign a room state to that selected time period. Specifically, a selection of a time period is configured to display an "Apply Room State" window 1619 comprising a plurality of selectable fields corresponding to various room states, as defined via the room states settings view in FIGS. 5-15. Each room state may be color coded. According to an embodiment, the building automation application 112 may apply default predefined colors to each room category. For example, the "Vacancy Off" category may be colored dark green, the "Vacancy Low" category may be colored medium green, the "Fast Vacancy Off" category may be colored light green, the "Occupancy Auto/Off" category may be colored dark pink, the "Occupancy Auto/Low" category may be colored light pink, the "Manual High" category may be colored grey, the "Lockout Auto" category may be colored orange, the "Lockout High" category may be colored dark yellow, the "Lockout Low" category may be colored light yellow, and the "Lockout Photocell" category may be colored blue. Other colors than indicated above may be used. According to an embodiment, a user may modify these colors during the setup process. A user may select a room state to apply it to the selected time period 1621 of the selected room category. In response, the building management application 112 colors the time interval blocks 1620a-n of the selected time period 1621 in the "Day Patterns" scheduling window 1610 with the color corresponding to the selected room state.

For example, for "Parking" room category, a user may select from the horizontal timeline 1616 plurality of time blocks 1620a-n spanning a time period 1621 from 6:00 AM to 5:00 PM. For the selected time period 1621, the user may choose to apply the "Lockout Photocell" room state from the "Apply Room State" window 1619. The building management application 112 may color the time blocks 1620a-n of the selected time period 1621 blue. In response, all spaces of building 102 that are classified under the "Parking" category will operate according to the defined "Lockout Photocell" room state from 6:00 AM to 5:00 PM on normal business days. The user may then assign other room states to the remaining time periods on the "Parking" timeline. For example, the user may specify that spaces classified as "Parking" will operate according to a "Lockout High" room state from 12:00 AM to 6:00 AM and from 5:00 PM to 11:59 PM. Accordingly, the user assigns desired room states to the "Parking" category throughout the entire course of the day.

The user may then proceed assigning any of the room states in "Apply Room State" window 1619 to the timelines of all the other room categories based on the time of day. For example, for lobbies, before work hours and after work hours, the lights are set to be at a low brightness and during work hours to be at high brightness, without any manual control. Lights at hallways and stairs may operate according to occupancy before and after work hours and be turned on at high brightness during work hours. Other room categories are similarly scheduled.

In another embodiment, the "Apply Room State" window 1619 may be initially shown in the day pattern view 1600 upon the selection of the "Day Patterns" tab 404. The various room states in the "Apply Room State" window 1619 may be represented as draggable virtual objects. The user may apply room states to time interval blocks 1620a-n via a drag-and-drop gesture. The user may first select a room state in the "Apply Room State" window 1619, "grab it" by holding the selected room state virtual object with a pointing device, such as a mouse, and drag it to a desired time interval block 1620a-n. The user may then expand the selected time interval block 1620a-n to span a wider time period 1621. The building management application 112 will color code the selected time period 1621 with the room state as discussed above.

As apparent in FIG. 16, the "Day Patterns" scheduling window 1610 provides an intuitive and simple way to program each room category without the need to create individual scheduled events for each room. All rooms under each room category will operate in the same way. After the initial setup where room states and categories are configured, the user may quickly move from one room category to the next and apply desired behavior. Additionally, according to an embodiment, only a single room state can be applied to a time block 1620*a-n*. As such, the building management application 112 of the present embodiments effectively eliminates conflicts in scheduled events.

After finishing applying room states to each time block 1620*a-n* on timeline 1616 of each room category, the user may move to schedule events for other types of days. For example, referring to FIG. 17, the user may schedule day patterns for a "Half Day" day type. Similarly, the user may schedule operation of the rooms during a "Weekend/Holiday" day type, "Late Hours" day type, or other types of days that may be present in the "Day Patterns" window 1601.

FIG. 18 illustrates a schematic diagram depicting a calendar view 1800 of the "Building Automation Scheduler" page 400 of the building automation application 112 according to an embodiment. The calendar view 1800 may be displayed by pressing the "Calendar" tab 402. Using the calendar view 1800, a user may assign any "Day Pattern" to any calendar day. According to the present principles, using the calendar view 1800 a user may quickly and easily schedule the operation of an entire building 102 for an entire year or longer time periods. The calendar view 1800 may comprise a calendar 1801, a "Legend" window 1802, and an "Apply Day Pattern" window 1803. The calendar 1801 may comprise arrows 1804 configured for allowing a user to select any year and any month of the year. The calendar 1801 may further comprise selectable day blocks 1806*a-n*.

The "Legend" window 1802 may list the various day patters, as defined in the "Day Pattern" tab 404, shown in FIG. 17. Each day pattern may be color coded. The "Legend" window 1802 may display the colors that identify corresponding types of day patterns. For example, normal business days may be green, weekend/holidays may be pink, half days may be blue, late hours may be orange. The "Legend" window 1802 may further comprise a changed default icon and an exception icon.

According to an embodiment, the "Apply Day Pattern" window 1803 may comprise selectable fields corresponding to day patterns. The "Apply Day Pattern" window 1803 may be initially not shown. Selection of a day block 1806*a-n* by a user may cause the display of the "Apply Day Pattern" window 1803. The user may then select a day pattern in the "Apply Day Pattern" window 1803 to assign the selected day pattern to the selected day block. The building management application 112 will color the selected day block 1806*a-n* with the color corresponding to the selected day pattern as defined in the legend window 1802. The building management application 112 will also associate the calendar day corresponding to the selected day block 1806 with the selected day pattern. In response, during the selected calendar date, the building 102 will operate according to the selected day pattern.

In another embodiment, the "Apply Day Pattern" window 1803 may be initially shown in the calendar view 1800 upon the selection of the "Calendar" tab 402. The various day patterns in the "Apply Day Pattern" window 1803 may be represented as draggable virtual objects. The user may apply day patterns to day blocks 1806*a-n* via a drag-and-drop gesture by first selecting a day pattern, "grabbing it", and dragging to a desired day block 1806. The building management application 112 will color code the selected day block 1806 with the selected day pattern and associate the calendar day corresponding to the selected day block 1806 with the selected day pattern.

According to another embodiment, after the user finishes configuring the system using the "Setting" tab 406 and the "Day Patterns" tab 404, the building management application 112 will automatically assign as a default the "Normal Business Day" day pattern to all weekdays of every month. The building management application 112 will also automatically assign as a default the "Weekend/Holiday" day pattern to all weekends of every month. The building management application 112 will further automatically assign applicable day patterns (e.g., "Weekend/Holiday" or "Half Day") to all the selected holidays as defined in the holidays settings view 1500 in FIG. 15. The day blocks 1806*a-n* of calendar 1801 will be color coded to identify the assigned day patterns.

These default calendar day settings assigned for each calendar day may be identified on the "Apply Day Pattern" window 1803 as the "Use Default" setting 1807. As such, the "Use Default" setting 1807 in the "Apply Day Pattern" window 1803 for each calendar day will be selected by default. The user may modify the default setting 1807 by clicking on any day block 1806*a-n* and selecting a different day pattern in the "Apply Day Pattern" window 1803. For example, for "Jan 29 2016" day block, the user may change the day pattern from "Use Default" day pattern 1807 to a "Half Day" day pattern. In response, the calendar 1801 may modify the color applied to that day block from green to blue. The calendar 1801 may also display a changed default icon 1809 indicating that the default setting was modified.

According to another embodiment, the user may modify a day pattern or enter an "exception" for any calendar day by selecting the day and selecting the add exception icon 1810. The add exception icon 1810 is configured for opening an "Add Exception" window 1900 as shown in FIG. 19. Referring to FIG. 19, the "Add Exception" window 1900 may comprise the "Lighting" tab 511, "Shades" tab 512, "Climate" tab 513, or similar tabs, to allow the user to specify the class or type of electronic devices for which the user wishes to add an exception. For example, as shown in FIG. 19, the user may elect to add an exception to the operation of lighting by selecting the "Lighting" tab 511.

The "Add Exception" window 1900 may further comprise radio buttons allowing the user to select whether the user wishes to add the exception for a "single room" 1902 or for an entire "room category" 1904. For example, if the user selects to add the exception for a "single room" 1902 the user may select the particular room from the "single room" drop down menu 1902. According to an embodiment, the user may select to apply the exception to one room or multiple rooms using the drop down menu 1902. If the user selects to add the exception for an entire "room category" 1904 the user may select the room category (as defined in the "Room Categories Setting View" 410 in FIG. 4) from the "room category" drop down menu 1904. According to an embodiment, the user may select to apply the exception to one room category or to multiple room categories using the drop down menu 1904. Next, the user may select the desired room state for the exception using the "Room State" drop down menu 1906. The "room state" drop down menu 1906 may list the room states defined in the "Room States" Window 501 (shown in FIG. 6).

The "Add Exception" window 1900 may further comprise time fields 1908 and date fields 1910 configured for allowing the user to specify the time period for which the user wishes for the exception to apply. Finally, the "Add Exception" window 1900 may comprise radio buttons 1912 configured for allowing the user to select the type of days for which the user wishes the exception to apply. The user may select the exception to apply to "every day from the start to the end date." In response, the exception will apply to each and every day occurring between the "Start date" and "End date" specified in the date fields 1910. Alternatively, the user may select the exception to apply "only on the specific day type from start to end date." In response, the exception will apply only to the day type corresponding to the selected day between the "Start date" and "End date" 1910. For example, as shown in FIG. 19, the user selected to apply the exception to Jan. 27, 2016, which corresponds to a "Normal Business" day type. When the user selects to apply the exception "only on the specific day type from start to end date," the exception will be only applied to calendar days that correspond to "Normal Business" days occurring between the selected "Start date" and "End date" as specified in the date fields 1910. In another embodiment, the user may select to apply the exception only to a single day that corresponds to the selected day block (i.e., Jan. 27, 2016) by leaving the "Start date" and "End date" fields 1910 blank.

When the user is done specifying the settings for the exception using the "Add Exception" window 1900, the user may press the "Save" button 1914. The scheduling application 112 will in turn apply the settings specified in the "Add Exception" window 1900 to the operation of the building during the selected time period. The settings specified in the "Add Exception" window 1900 will be accorded top priority and override the day pattern settings set using the "Day Patterns View" 1600 for the selected time period specified in the time fields 1908 and date period specified in the date fields 1910. For the remainder of the time, the scheduling application 112 will operate the building according to the applied day pattern. Additionally, the scheduling application 112 will display an exception icon 1916 on each day block that is affected by the exception. The user may cancel the exception at any time by selecting the exception icon 1916, causing the "Add Exception" Window 1900 with the previously selected settings to appear. The user may then edit the exception as desired using the selectable fields or cancel the exception by pressing the "Cancel" button 1918.

Apart from lighting, the building automation application 112 may be configured for scheduling other types of electronic devices 105 in a similar manner discussed above. For example, FIG. 20 illustrates a schematic diagram depicting a day patterns view 2000 to schedule day patterns for shading types of devices. The user may select the "Shades" tab 512 and press on the "Day Patterns" tab 404 to program scheduled events for shades. The shades day patterns view 2000 may be similar to the view shown in FIG. 16 for lighting. Only the types of rooms states listed in the "Apply Room State" window 2001 will change to room states that correspond to shading control. The shading room states may comprise a "Lockout Open" room state 2002a, a "Lockout Closed" room state 2002b, a "Lockout Photocell" room state 2002c, and a "Manual Photocell" room state 2002d. Other shading room states are contemplated by the present embodiments. The shade states may be configured using similar windows as shown in FIGS. 5 through 14.

Similar to lighting, a room that is in a "Lockout" mode will have occupancy sensor control (if any) disabled. Additionally, all the manual controls in the room or space for controlling shading, such as keypads, will be disabled. During the "Lockout" mode, the shades are set to a chosen "Initial Scene" and will remain at that scene even when a keypad for controlling the shades in the room is pressed. The user may select and specify the desired "Initial Scene" using a drop-down menu similar to the "Initial Scene" drop down menu 1202 in FIG. 12. The "Initial Scene" drop-down menu for shading may comprise "Closed", "Open", and "Photocell". Other scenes may be used.

For example, the user may add a "Lockout Closed" 2002b room state by choosing a "Lockout" room state and a "Closed" initial scene. During the "Lockout Closed" room state 2002b, the shades are set to a closed state and will remain closed even when the keypad in the room is pressed.

A user may also add a "Lockout Open" room state 2002a by choosing a "Lockout" room state and an "Open" initial scene. During the "Lockout Open" state, the shades are set to an opened state and will remain open even when the keypad in the room is pressed.

Further, a user may also add a "Lockout Photocell" room state 2002c by choosing a "Lockout" room state and a "Photocell" initial scene. During the "Lockout Photocell" state 2002c, the shades will be exclusively controlled by a photocell. The system of the present embodiments may utilize an algorithm that controls the level of the shades according to detected ambient light level. During the "Lockout Photocell" state 2002c all manual control and occupancy sensor shade control will be disabled.

During the "Manual Photocell" room state 2002d, the shades will be controlled by a photocell, but can be also controlled manually by a room occupant by pressing on a desired scene button on the keypad installed in the room. According to an embodiment, when an occupancy sensor detects that the room has been vacated for a certain period of time (i.e., for a "Vacancy Timeout as may be specified by the user), the shades can return to be controlled by the photocell.

For each day type in the "Day Patterns" window 1601, the user can define day patterns by assigning the shading room states from the "Apply Room State" window 2001 to room categories over a course of the day in timeline 2004 in similar fashion as described above with reference to FIG. 16. According to an embodiment, when the day types are then assigned to calendar days as described with reference to FIG. 18, the building scheduling application 112 can control lighting based on the defined lighting day patterns and shading based on the defined shading day patterns.

FIG. 21 illustrates a schematic diagram depicting a day patterns view 2100 to schedule day patterns for climate or HVAC devices. The user may select the "Climate" tab 513 and press the "Day Patterns" tab 404 to program scheduled events for the HVAC devices. The climate day patterns view 2100 may be similar to the view shown in FIG. 16 for lighting. Only the types of rooms states listed in the "Apply Room State" window 2101 will change to room states that correspond to climate control. The room states for climate control may comprise a "Setback" room state 2102a, a "Normal/Setback" room state 2102b, a "Normal" room state 2102c, and a "Normal/Standby" room state 2102d. Other climate room states are contemplated by the present embodiments. The climate room states may be configured using similar windows as shown in FIGS. 5 through 14.

During the "Normal" room state 2102c, the HVAC is set to and maintained at a chosen "Initial Temperature". The configuration window for configuring the "Normal" room state 2102c may contain an entry field for the user to select the desired "Initial Temperature." For example, the initial temperature may be set to 72 degrees Fahrenheit. According to various aspects of the embodiments, the system may lockout manual control or permit manual control for the "Normal" room state operation. The "Normal" room state 2102c can for example be assigned to lobbies and open offices for a "Normal Business Day" type during business hours.

During the "Setback" room state 2102a, the HVAC is set to operate in an energy saving mode. At summer time, the temperature may be set at a higher level, and at winter time the temperature may be set to a lower level. According to an embodiment, the user may specify the setback temperature settings for the summer and winter periods using a "Summer Temperature Setback" and "Winter Temperature Setback" selections. The "Setback" room state 2102a can for example be assigned to lobbies and open offices during weekends and after business hours.

During the "Normal/Setback" room state 2102b, the HVAC is set to operate at a "Normal" room state (as defined above) when the room is occupied (as indicated by an occupancy sensor), and at a "Setback" room state (as defined above) when the room is vacant. For example, during the summer the room may be set to 72 degrees Fahrenheit when the room is occupied and 76 degrees Fahrenheit when it is vacant. The "Normal/Setback" room state 2102b may for example be assigned to conference rooms and private offices after business hours to maintain normal room temperatures when employees are still preset in the rooms, but change the temperature levels to energy saving mode when the employees have left the rooms.

During the "Normal/Standby" room state 2102d, the HVAC is set to operate at a "Normal" room state (as defined above) when the room is occupied (as indicated by an occupancy sensor), and at a "Standby" mode when the room is vacant. In the "Standby" mode the temperature may be raised or lowered by a few degrees such that the room temperature can go back quickly to a "Normal" mode when the room is again occupied. This setting can be used during business hours in conference rooms and private offices.

Industrial Applicability

To solve the aforementioned problems, the aspects of the embodiments are directed towards building automation scheduling system and method for scheduling electronic devices of a building automation system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A room scheduling system for scheduling electronic devices of a building automation system comprising:
   a plurality of electronic devices each installed within a space in a building and adapted to receive control commands and in response change at least one environmental condition within the space;
   a database comprising a plurality of space nodes identifying spaces located within a building and associated with one or more of the plurality of electronic devices installed within respective spaces in the building, wherein the database further comprises a calendar comprising weekdays, weekends, and holidays; and
   a processor in communication with the plurality of electronic devices and comprising a memory encoding one or more processor-executable instructions, which when executed by the at least one processor, cause acts to be performed comprising:
   classifying the space nodes by room categories;
   defining room states each comprising at least one control command for one or more electronic devices in a space;
   defining a weekday day pattern, a weekend day pattern, and a holiday day pattern by assigning for each day pattern at least one room state to at least one room category over a course of a day;
   automatically assigning the weekday day pattern to the weekdays on the calendar;
   automatically assigning the weekend day pattern to weekends on the calendar;
   automatically assigning the holiday day pattern to holidays on the calendar; and
   transmitting control commands to the one or more of the electronic devices during a calendar day according to the assigned day pattern.

2. The system of claim 1, wherein the room categories comprises one of lobbies, hallways, staircases, common areas, conference rooms, private offices, open offices, bathrooms, exterior, parking, and any combinations thereof.

3. The system of claim 1 further comprising a user interface configured for displaying a list of selectable space nodes and a list of selectable room categories, wherein the processor is configured for:
receiving a selection of a space node from the list of selectable space nodes;
receiving a selection of a room category from the list of selectable room categories;
associating the selected space node with the selected room category; and
storing the association in the database.

4. The system of claim 1, wherein each of the plurality of space nodes comprises descriptive information, wherein in classifying the space nodes by room categories the processor is configured for:
storing a list of room categories;
scanning through the descriptive information; and
comparing the descriptive information to the list of stored categories.

5. The system of claim 1, wherein each room state comprises at least two control commands for at least two electronic devices installed in a space.

6. The system of claim 1, wherein the database comprises a plurality of predefined room states.

7. The system of claim 6, wherein each of the predefined room states comprises at least one setting for selection by a user.

8. The system of claim 7, wherein the room states comprise a vacancy room state comprising a vacancy scene setting and a vacancy timeout setting for selection by a user, wherein the vacancy room state comprises at least one control command configured for enabling an occupancy sensor to operate in a vacancy mode where an electronic device in a space is set to a selected vacancy scene when the occupancy sensor determines that a space has been vacated for a selected vacancy timeout.

9. The system of claim 7, wherein the room states comprise an occupancy room state comprising an occupancy scene setting, a vacancy scene setting, and a vacancy timeout setting for selection by a user, wherein the occupancy room state comprises at least one control command configured for enabling an occupancy sensor to operate in an occupancy mode where an electronic device in a space is set to a selected occupancy scene when the occupancy sensor determines that the space is occupied and set to a selected vacancy scene when the occupancy sensor determines that the space has been vacated for a selected vacancy timeout.

10. The system of claim 7, wherein the room states comprise a manual room state comprising an initial scene setting for selection by a user, wherein the manual room state comprises at least one control command configured for setting an electronic device in a space to a selected initial scene and enabling manual control of the electronic device in the space.

11. The system of claim 7, wherein the room states comprise a lockout room state comprising an initial scene setting for selection by a user, wherein the lockout room state comprises at least one control command configured for setting an electronic device in a space to a selected initial scene and disabling manual control of the electronic device in the space.

12. The system of claim 7, wherein the room states comprise a photocell room state comprising at least one control command configured for enabling a photocell to control an electronic device according to detected ambient light levels.

13. The system of claim 1, wherein the day patterns comprise day patterns for a plurality of day types.

14. The system of claim 13, wherein the day patterns comprise one of a normal day day-pattern, a weekend day-pattern, a holiday day pattern, a half day day-pattern, a late hours day-pattern, and any combinations thereof.

15. The system of claim 1, further comprising a user interface configured for displaying a list of the room states and day timelines each corresponding to a respective room category of the room categories and each comprising selectable time intervals.

16. The system of claim 15, wherein the processor is further configured for:
receiving a selection of a time interval on a day timeline of a selected room category;
receiving a selection of a room state from the list of room states;
associating the selected time interval, the selected room category, and the selected room states; and
storing the association in the database.

17. The system of claim 16, wherein each room state is color coded, wherein the user interface is configured for displaying the selected time interval with a color corresponding to the selected room state.

18. The system of claim 1, wherein the weekend day pattern and the holiday day pattern comprises a single day pattern.

19. The system of claim 1, further comprising a user interface configured for allowing a user to choose the holidays included in the calendar.

20. The system of claim 1, further comprising a user interface configured for displaying the calendar, wherein each day pattern is color coded, wherein the user interface is configured for displaying the weekdays on the calendar with a first color corresponding to the weekday day pattern and displaying the weekends with a second color corresponding to the weekend day pattern.

21. The system of claim 1 further comprises a user interface configured for displaying the calendar, wherein the calendar comprises day blocks associated with the calendar days.

22. The system of claim 21, wherein the user interface comprises a list of the day patterns, and wherein the processor is further configured for:
receiving a selection of a day block from the calendar;
receiving a selection of a day pattern from the list of day patterns;
associating a calendar day of the selected day block with the selected day pattern; and
storing the association in the database.

23. The system of claim 22, wherein each day pattern is color coded, wherein the user interface is configured for displaying the selected day block with a color corresponding to the selected day pattern.

24. The system of claim 22, wherein during a calendar day associated with the selected day block the processor is further configured for:
transmitting control commands to the one or more electronic devices to operate according to the selected day pattern.

25. The system of claim 21, wherein each day pattern is color coded, wherein the user interface is configured for displaying the day blocks with colors corresponding to respective day patterns.

26. A method for scheduling a building automation system comprising a plurality of electronic devices, the method comprising the steps of:
- storing a plurality of space nodes identifying spaces located within a building and associated with one or more of the plurality of electronic devices installed within respective spaces in the building;
- storing a calendar comprising weekdays, weekends, and holidays;
- classifying the space nodes by room categories;
- defining room states each comprising at least two control commands for at least two electronic devices installed in a space;
- defining a weekday day pattern, a weekend day pattern, and a holiday day pattern by assigning for each day pattern at least one room state to at least one room category over a course of a day;
- automatically assigning the weekday day pattern to the weekdays on the calendar;
- automatically assigning the weekend day pattern to weekends on the calendar;
- automatically assigning the holiday day pattern to holidays on the calendar; and
- transmitting control commands to the one or more electronic devices during a calendar day according to the assigned day pattern;
- wherein each electronic device is adapted to receive the control commands and in response change at least one environmental condition within a respective space.

27. A room scheduling system for scheduling electronic devices of a building automation system comprising:
- a plurality of electronic devices each installed within a space in a building and adapted to receive control commands and in response change at least one environmental condition within the space;
- a database comprising a plurality of space nodes identifying spaces located within a building and associated with one or more of the plurality of electronic devices installed within respective spaces in the building, wherein each of the plurality of space nodes comprises descriptive information; and
- a processor in communication with the plurality of electronic devices and comprising a memory encoding one or more processor-executable instructions, which when executed by the at least one processor, cause acts to be performed comprising:
  - classifying the space nodes by room categories by scanning through the descriptive information of the space nodes and comparing the descriptive information to a list of stored categories;
  - defining room states each comprising at least one control command for one or more electronic devices in a space;
  - defining day patterns by assigning at least one room state to at least one room category over a course of a day;
  - assigning the day patterns to calendar days on a calendar; and
  - transmitting control commands to the one or more of the electronic devices during a calendar day according to the assigned day pattern.

28. A room scheduling system for scheduling electronic devices of a building automation system comprising:
- a plurality of electronic devices each installed within a space in a building and adapted to receive control commands and in response change at least one environmental condition within the space;
- a database comprising a plurality of space nodes identifying spaces located within a building and associated with one or more of the plurality of electronic devices installed within respective spaces in the building; and
- a user interface configured for displaying a list of room states and day timelines each corresponding to a room category and each comprising selectable time intervals;
- a processor in communication with the plurality of electronic devices and comprising a memory encoding one or more processor-executable instructions, which when executed by the at least one processor, cause acts to be performed comprising:
  - classifying the space nodes by room categories;
  - defining the room states each comprising at least one control command for one or more electronic devices in a space;
  - defining day patterns by assigning at least one room state to at least one room category over a course of a day by:
    - receiving selections of time intervals on a day timeline of selected room categories;
    - receiving selections of room states from the list of room states;
    - associating the selected time intervals, the selected room categories, and the selected room states; and
    - storing the associations in the database;
  - assigning the day patterns to calendar days on a calendar; and
  - transmitting control commands to the one or more of the electronic devices during a calendar day according to the assigned day pattern.

* * * * *